(12) United States Patent
Kim et al.

(10) Patent No.: US 9,038,464 B2
(45) Date of Patent: May 26, 2015

(54) ANGULAR VELOCITY SENSOR

(71) Applicant: SAMSUNG ELECTRO-MECHANICS CO., LTD., Suwon-si (KR)

(72) Inventors: Jong Woon Kim, Suwon-si (KR); Jun Lim, Suwon-si (KR); Jae Chang Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/140,917

(22) Filed: Dec. 26, 2013

(65) Prior Publication Data
US 2014/0182375 A1 Jul. 3, 2014

(30) Foreign Application Priority Data
Dec. 28, 2012 (KR) .................. 10-2012-0157160

(51) Int. Cl.
*G01C 19/00* (2013.01)
*G01C 19/56* (2012.01)

(52) U.S. Cl.
CPC ...................................... *G01C 19/56* (2013.01)

(58) Field of Classification Search
CPC ..... G01C 19/16; G01C 19/56; G01C 19/5705
USPC ......... 73/493, 503.3, 504.02, 504.08, 504.11, 73/504.14, 504.18
See application file for complete search history.

(56) References Cited

U.S. PATENT DOCUMENTS

| | | | | |
|---|---|---|---|---|
| 5,392,650 A * | 2/1995 | O'Brien et al. | ............ | 73/514.18 |
| 5,648,618 A * | 7/1997 | Neukermans et al. | ..... | 73/862.08 |
| 5,905,201 A * | 5/1999 | Petri | ........................... | 73/504.03 |
| 5,992,233 A * | 11/1999 | Clark | .......................... | 73/514.35 |
| 6,067,858 A * | 5/2000 | Clark et al. | ................ | 73/504.16 |
| 6,134,961 A * | 10/2000 | Touge et al. | ................. | 73/504.12 |
| 6,752,017 B2 * | 6/2004 | Willig et al. | ................ | 73/504.04 |
| 6,964,195 B2 * | 11/2005 | Hobbs et al. | ................ | 73/504.14 |
| 7,004,024 B1 * | 2/2006 | Park | ........................... | 73/504.16 |
| 7,051,591 B2 * | 5/2006 | Chaumet et al. | ............ | 73/504.12 |
| 7,318,349 B2 * | 1/2008 | Vaganov et al. | ............ | 73/514.33 |
| 8,061,203 B2 * | 11/2011 | Aizawa et al. | ................... | 73/510 |
| 8,117,914 B2 * | 2/2012 | Ohuchi et al. | ............. | 73/504.12 |
| 8,241,923 B2 * | 8/2012 | Morii | ................................ | 438/8 |
| 8,479,575 B2 * | 7/2013 | Kempe | ..................... | 73/504.12 |
| 8,689,632 B2 * | 4/2014 | Jia et al. | ..................... | 73/504.12 |
| 8,726,730 B1 * | 5/2014 | Nielson et al. | ............. | 73/504.01 |
| 2005/0160814 A1 * | 7/2005 | Vaganov et al. | ........... | 73/514.01 |
| 2006/0053885 A1 * | 3/2006 | Park | ........................... | 73/504.16 |
| 2008/0034867 A1 * | 2/2008 | Kazama et al. | ............ | 73/514.33 |
| 2010/0071468 A1 * | 3/2010 | Ohuchi et al. | ............. | 73/504.12 |

(Continued)

*Primary Examiner* — Laura Martin
*Assistant Examiner* — Samir M Shah
(74) *Attorney, Agent, or Firm* — Ladas & Parry, LLP

(57) ABSTRACT

Disclosed herein is an angular velocity sensor including: first and second mass bodies; a first frame provided at an outer side of the first and second mass bodies; a first flexible part connecting the first and second mass bodies to the first frame in a Y axis direction, respectively; a second flexible part connecting the first and second mass bodies to the first frame in an X axis direction, respectively; a second frame provided at an outer side of the first frame; a third flexible part connecting the first and second frames to each other in the X axis direction; and a fourth flexible part connecting the first and second frames to each other in the Y axis direction, wherein the first frame has a thickness in a Z axis direction thinner than that of the second frame.

38 Claims, 30 Drawing Sheets

(56) References Cited

U.S. PATENT DOCUMENTS

| | | | |
|---|---|---|---|
| 2010/0129215 A1* | 5/2010 | Preus | 416/41 |
| 2011/0146404 A1 | 6/2011 | Jeung | |
| 2012/0048017 A1* | 3/2012 | Kempe | 73/504.12 |
| 2012/0272732 A1* | 11/2012 | Leverrier | 73/504.12 |
| 2013/0180332 A1* | 7/2013 | Jia et al. | 73/504.12 |
| 2013/0319114 A1* | 12/2013 | Kim et al. | 73/504.11 |
| 2014/0069189 A1* | 3/2014 | Kim et al. | 73/514.02 |
| 2014/0084393 A1* | 3/2014 | Kim et al. | 257/415 |
| 2014/0208848 A1* | 7/2014 | Krylov et al. | 73/504.12 |

\* cited by examiner

ANGULAR VELOCITY SENSOR

CROSS REFERENCE TO RELATED APPLICATION

This application claims the benefit of Korean Patent Application No. 10-2012-0157160, filed on Dec. 28, 2012, entitled "Angular Velocity Sensor", which is hereby incorporated by reference in its entirety into this application.

BACKGROUND OF THE INVENTION

1. Technical Field

The present invention relates to an angular velocity sensor.

2. Description of the Related Art

Recently, an angular velocity sensor has been used in various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The angular velocity sensor generally adopts a configuration in which a mass body is adhered to an elastic substrate such as a membrane, or the like, in order to measure angular velocity. Through the configuration, the angular velocity sensor may calculate the angular velocity by measuring Coriolis force applied to the mass body.

In detail, a scheme of measuring the angular velocity using the angular velocity sensor is as follows. First, the angular velocity may be measured by Coriolis force "$F=2\ m\Omega \times v$", where "F" represents the Coriolis force applied to the mass body, "m" represents the mass of the mass body, "$\Omega$" represents the angular velocity to be measured, and "v" represents the motion velocity of the mass body. Among others, since the motion velocity V of the mass body and the mass m of the mass body are values known in advance, the angular velocity $\Omega$ may be obtained by detecting the Coriolis force (F) applied to the mass body.

Meanwhile, the angular velocity sensor according to the prior art includes a piezoelectric material disposed on a membrane (a diaphragm) in order to sense driving a mass body or displacement of the mass body, as disclosed in Patent Document of the following Prior Art Document. In order to measure the angular velocity using the angular velocity sensor, it is preferable to allow a resonant frequency of a driving mode and a resonant frequency of a sensing mode to almost coincide with each other. However, very large interference occurs between the driving mode and the sensing mode due to a fine manufacturing error caused by a shape, stress, a physical property, or the like. Therefore, since a noise signal significantly larger than an angular velocity signal is output, circuit amplification of the angular velocity signal is limited, such that sensitivity of the angular velocity sensor is deteriorated, and air damping according to structural characteristics is generated, such that driving displacement is limited.

PRIOR ART DOCUMENT

Patent Document (Patent Document 1) US20110146404 A1

SUMMARY OF THE INVENTION

The present invention has been made in an effort to provide an angular velocity sensor including a plurality of frames to individually generate driving displacement and sensing displacement of mass bodies and including flexible parts formed so that the mass bodies are movable only in specific directions to remove interference between a driving mode and a sensing mode, decrease an effect due to a manufacturing error, and minimize air damping inevitably generated due to structural characteristics, such that driving displacement is maximized, thereby increasing sensing efficiency.

According to a preferred embodiment of the present invention, there is provided an angular velocity sensor including: first and second mass bodies; a first frame provided at an outer side of the first and second mass bodies so as to be spaced apart from the first and second mass bodies; a first flexible part respectively connecting the first and second mass bodies to the first frame; a second flexible part respectively connecting the first and second mass bodies to the first frame; a second frame provided at an outer side of the first frame so as to be spaced apart from the first frame; a third flexible part connecting the first and second frames to each other; and a fourth flexible part connecting the first and second frames to each other, wherein the first and second mass bodies are disposed at both sides of the fourth flexible part, respectively, and the first frame has a thickness thinner than that of the second frame.

The first and second mass bodies are rotatably connected to the first frame by the first flexible part or the second flexible part, and the first frame is rotatably connected to the second frame by the third flexible part or the fourth flexible part.

The second flexible part respectively connecting the first and second mass bodies to the first frame in an X axis direction, and the fourth flexible part connecting the first and second frames to each other in the Y axis direction.

The first flexible part respectively connecting the first and second mass bodies to the first frame in a Y axis direction, and the third flexible part connecting the first and second frames to each other in the X axis direction.

The first flexible part respectively connecting the first and second mass bodies to the first frame in a Y axis direction, the second flexible part respectively connecting the first and second mass bodies to the first frame in an X axis direction, the third flexible part connecting the first and second frames to each other in the X axis direction, and the fourth flexible part connecting the first and second frames to each other in the Y axis direction.

The first and second mass bodies may include first step parts formed at connection parts at which they are connected to the second flexible part and depressed so as to be stepped inwardly.

The first step parts may be formed to be symmetrical to each other in one direction and the other direction of the first and second mass bodies.

The first and second mass bodies may include second step parts formed at connection part sides at which they are connected to the first flexible part.

The second step parts may be formed to be symmetrical to each other in one direction and the other direction of the first and second mass bodies.

The first frame may be formed to have a thickness in the Z axis direction thinner than those of the first and second mass bodies.

The first flexible part may have a width in the X axis direction larger than a thickness in the Z axis direction, the second flexible part may have a thickness in the Z axis direction larger than a width in the Y axis direction, the third flexible part may have a width in the Y axis direction larger than a thickness in the Z axis direction, and the fourth flexible part may have a thickness in the Z axis direction larger than a width in the X axis direction.

The first and second mass bodies may be rotated based on the X axis with respect to the first frame.

The first frame may be rotated based on the Y axis with respect to the second frame.

Bending stress may be generated in the first flexible part, and twisting stress may be generated in the second flexible part.

Bending stress may be generated in the third flexible part, and twisting stress may be generated in the fourth flexible part.

The second flexible part may be disposed over the center of gravity of the first and second mass bodies based on the Z axis direction.

The second flexible part may be disposed at a position corresponding to the center of gravity of the first and second mass bodies based on the X axis direction.

The angular velocity sensor may further include a first sensing unit provided on the first flexible part to sense displacement of the first and second mass bodies, wherein the first sensing unit senses the displacement generated when the first and second mass bodies are rotated based on an X axis.

The angular velocity sensor may further include a first driving unit provided on the third flexible part to drive the first frame, wherein the first driving unit drives the first frame so as to be rotated based on a Y axis.

The angular velocity sensor may further include a first support part provided between the first and second mass bodies so as to transverse the first frame in the Y axis direction, wherein the first support part has a thickness in the Z axis that is the same as that of the first frame.

The second flexible part may be formed in a torsion bar shape, and the fourth flexible part may be formed in a torsion bar shape.

The first and second mass bodies may be disposed to be in parallel with each other.

The angular velocity sensor may further include: third and fourth mass bodies disposed to be perpendicular to the first and second mass bodies in the X or Y axis direction, respectively; a third frame provided at an outer side of the third and fourth mass bodies so as to be spaced apart from the third and fourth mass bodies; a fifth flexible part connecting the third and fourth mass bodies to the third frame in the X axis direction, respectively; a sixth flexible part connecting the third and fourth mass bodies to the third frame in the Y axis direction, respectively; a fourth frame provided at an outer side of the third frame so as to be spaced apart from the third frame; a seventh flexible part connecting the third and fourth frames to each other in the Y axis direction; and an eighth flexible part connecting the third and fourth frames to each other in the X axis direction, wherein the third and fourth mass bodies are disposed at both sides of the eighth flexible part based on the Y axis direction, respectively, the fourth frame is disposed at a side of the second frame, and the third frame has a thickness in the Z axis direction thinner than that of the fourth frame.

The third and fourth mass bodies may include first step parts formed at connection parts at which they are connected to the sixth flexible part and depressed so as to be stepped inwardly.

The first step parts may be formed to be symmetrical to each other in one direction and the other direction of the third and fourth mass bodies.

The third and fourth mass parts may include second step parts formed at connection part sides at which they are connected to the fifth flexible part.

The second step parts may be formed to be symmetrical to each other in one direction and the other direction of the third and fourth mass bodies.

The third frame may be formed to have a thickness in the Z axis direction thinner than those of the third and fourth mass bodies.

The fifth flexible part may have a width in the Y axis direction larger than a thickness in the Z axis direction, the sixth flexible part may have a thickness in the Z axis direction larger than a width in the X axis direction, the seventh flexible part may have a width in the X axis direction larger than a thickness in the Z axis direction, and the eighth flexible part may have a thickness in the Z axis direction larger than a width in the Y axis direction.

The third and fourth mass bodies may be rotated based on the Y axis with respect to the third frame.

The third frame may be rotated based on the X axis with respect to the fourth frame.

Bending stress may be generated in the fifth flexible part, and twisting stress may be generated in the sixth flexible part.

Bending stress may be generated in the seventh flexible part, and twisting stress may be generated in the eighth flexible part.

The sixth flexible part may be disposed over the center of gravity of the third and fourth mass bodies based on the Z axis direction.

The sixth flexible part may be disposed at a position corresponding to the center of gravity of the third and fourth mass bodies based on the Y axis direction.

The angular velocity sensor may further include a second sensing unit provided on the fifth flexible part to sense displacement of the third and fourth mass bodies, wherein the second sensing unit senses the displacement generated when the third and fourth mass bodies are rotated based on a Y axis.

The angular velocity sensor may further include a second driving unit provided on the seventh flexible part to drive the third frame, wherein the second driving unit drives the third frame so as to be rotated based on an X axis.

The angular velocity sensor may further include a second support part provided between the third and fourth mass bodies so as to transverse the third frame in the X axis direction, wherein the second support part has a thickness in the Z axis direction that is the same as that of the third frame.

The sixth flexible part may be formed in a torsion bar shape, and the eighth flexible part may be formed in a torsion bar shape.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
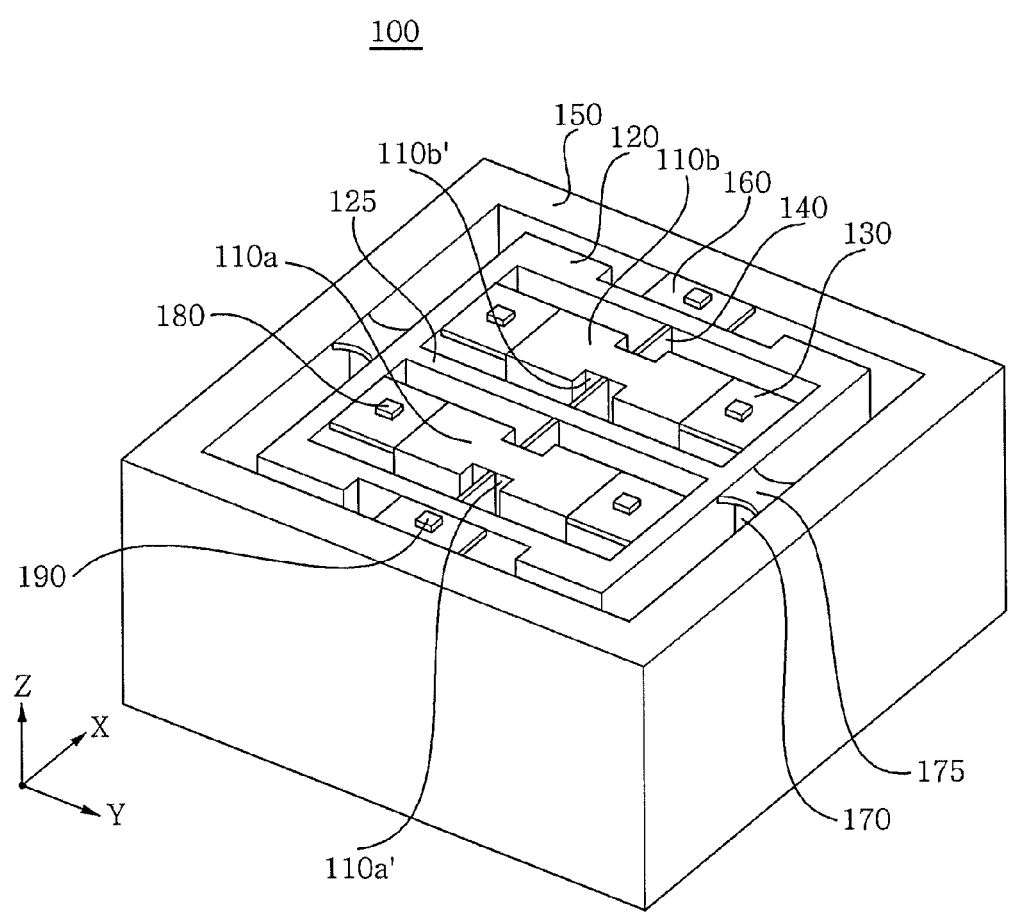
FIG. 1 is a perspective view of an angular velocity sensor according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
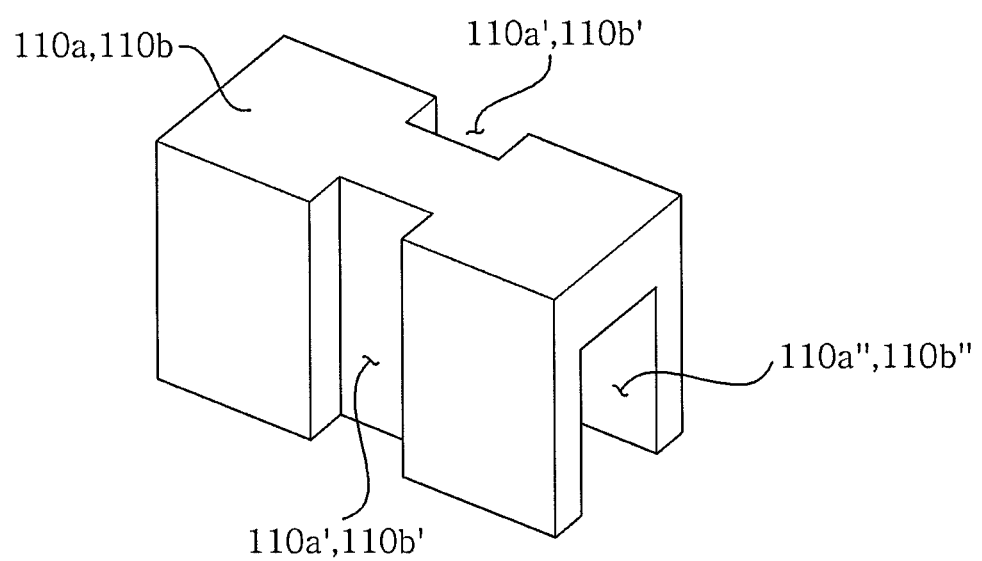
FIG. 2 is a perspective view showing a mass body of the angular velocity sensor shown in FIG. 1.
Figure 3:
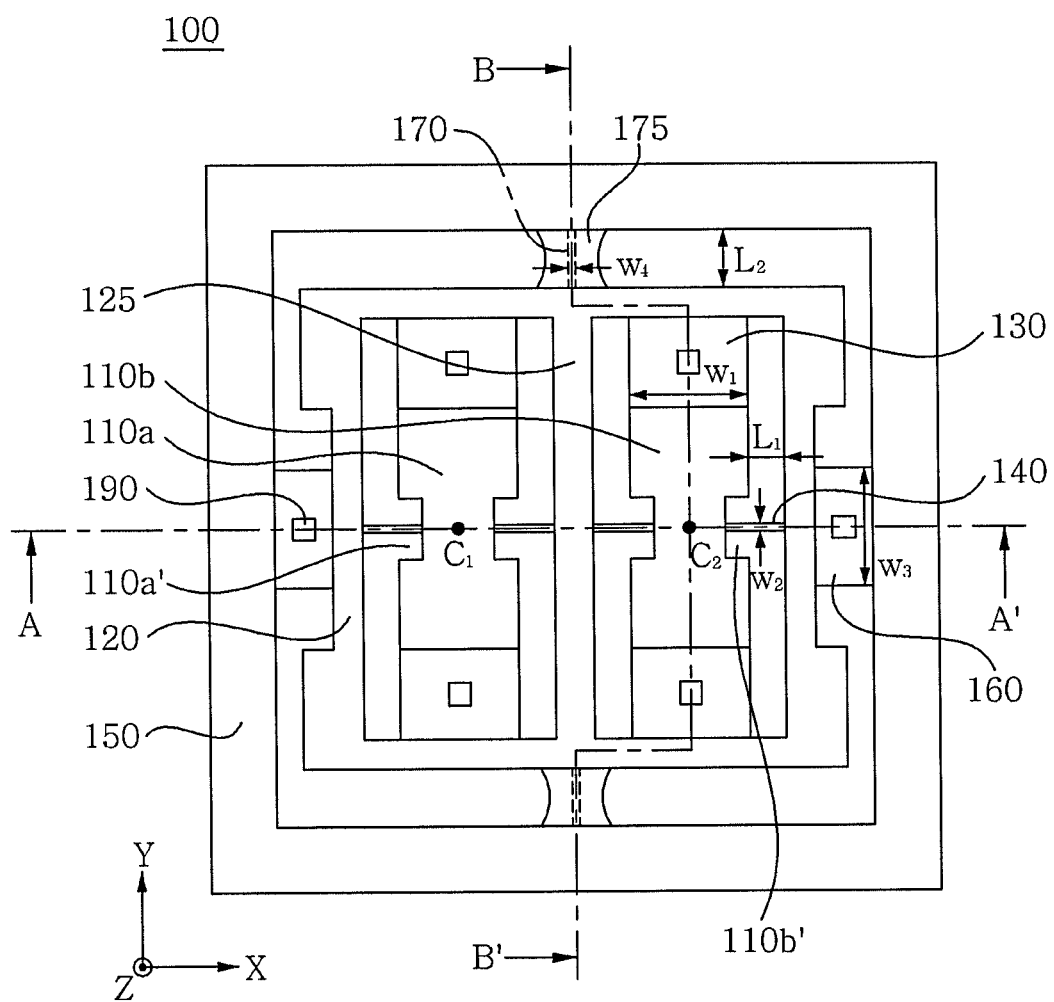
FIG. 3 is a plan view of the angular velocity sensor shown in FIG. 1.
Figure 4:
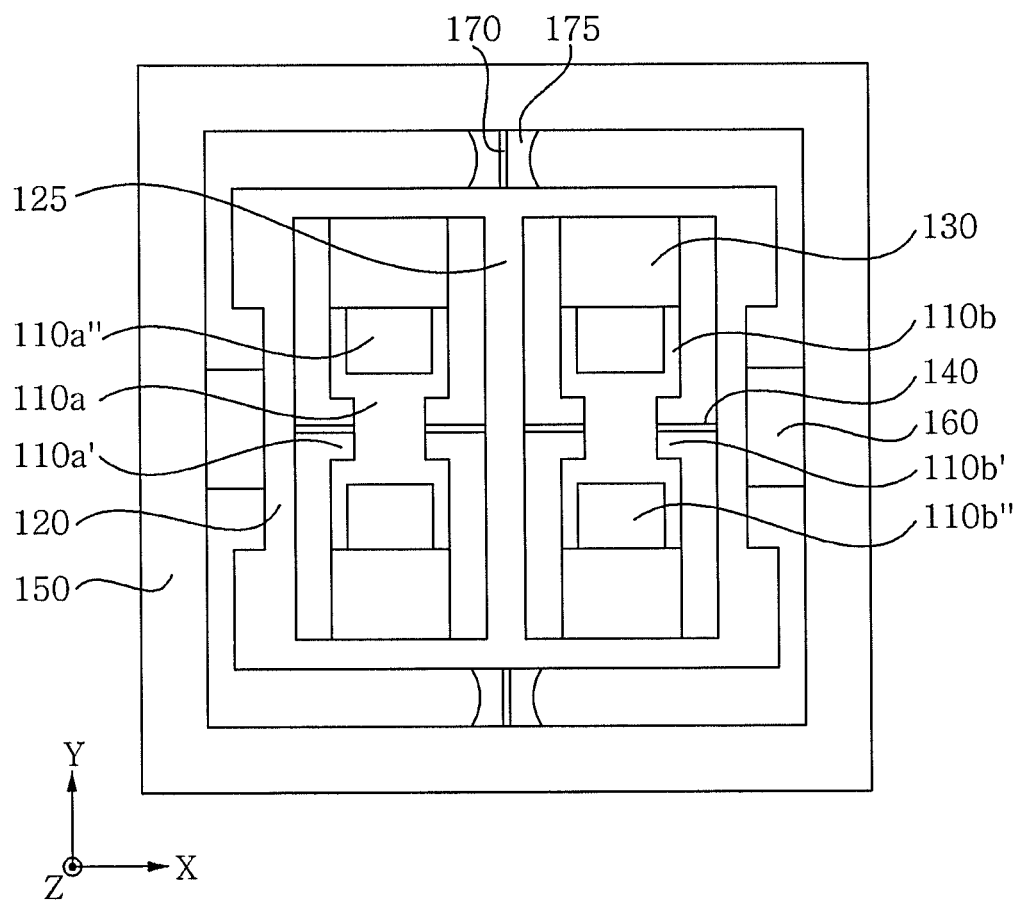
FIG. 4 is a bottom view of the angular velocity sensor shown in FIG. 1.
Figure 5:
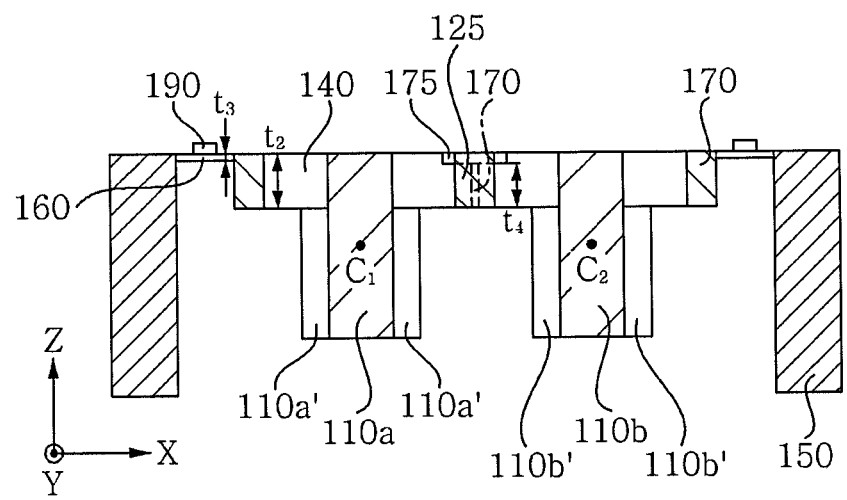
FIG. 5 is a cross-sectional view of the angular velocity sensor taken along the line A-A' of FIG. 3.

FIG. 1 is a perspective view of an angular velocity sensor according to a first preferred embodiment of the present invention; FIG. 2 is a perspective view showing a mass body of the angular velocity sensor shown in FIG. 1; FIG. 3 is a plan view of the angular velocity sensor shown in FIG. 1; FIG. 4 is a bottom view of the angular velocity sensor shown in FIG. 1; and FIG. 5 is a cross-sectional view of the angular velocity sensor taken along the line A-A' of FIG. 3.

As shown in FIGS. 1 to 5, the angular velocity sensor 100 according to the first preferred embodiment of the present invention is configured to include first and second mass bodies 110a and 110b, a first frame 120 provided at an outer side of the first and second mass bodies 110a and 110b so as to be spaced apart from the first and second mass bodies 110a and 110b, a first flexible part 130 connecting the first and second mass bodies 110a and 110b to the first frame 120 in a Y axis direction, respectively, a second flexible part 140 connecting the first and second mass bodies 110a and 110b to the first frame 120 in an X axis direction, respectively, a second frame 150 provided at an outer side of the first frame 120 so as to be spaced apart from the first frame 120, a third flexible part 160 connecting the first and second frames 120 and 150 to each other in the X axis direction, and a fourth flexible part 170 connecting the first and second frames 120 and 150 to each other in the Y axis direction, wherein the first and second mass bodies 110a and 110b are disposed at both sides of the fourth flexible part 170 based on the X axis direction, respectively.

The first and second mass bodies 110a and 110b, which are displaced by Coriolis force, may be connected to the first frame 120 through the first and second flexible parts 130 and 140 and be disposed to be in parallel with each other. Here, the first and second mass bodies 110a and 110b are displaced based on the first frame 120 by bending of the first flexible part 130 and twisting of the second flexible part 140 when Coriolis force acts thereon. Here, the first and second mass bodies 110a and 110b are rotated based on the X axis with respect to the first frame 120. A detailed content associated with this will be described below.

In addition, the first and second mass bodies 110a and 110b have a substantially square pillar shape and include first step parts 110a' and 110b' and second step parts 110a" and 110b" depressed so as to be stepped inwardly, respectively, as shown in more detail in FIG. 2.

More specifically, the first step parts 110a' and 110b' are formed at connection parts at which the first and second mass bodies 110a and 110b are connected to the second flexible part 140, respectively, which is to increase a length of the second flexible part 140, thereby increasing displacement and detection sensitivity of the first and second mass bodies 110a and 110b.

In addition, the second step parts 110a" and 110b" are formed at connection part sides at which the first and second mass bodies 110a and 110b are connected to the first flexible part 130, respectively, which is to prevent deterioration of sensitivity according to air damping of the mass bodies.

Further, the first step parts 110a' and 110b' and the second step parts 110a" and 110b" are formed to be symmetrical to each other in one direction and the other direction of the first and second mass bodies 110a and 110b.

Meanwhile, although the case in which the first and second mass bodies 110a and 110b have the substantially square pillar shape as described above is shown, the first and second mass bodies 110a and 110b are not limited to having the above-mentioned shape, but may have all shapes known in the art.

In addition, the first frame 120 supports the first and second flexible parts 130 and 140 to allow a space in which the first and second mass bodies 110a and 110b may be displaced to be secured and becomes a basis when the first and second mass bodies 110a and 110b are displaced. Here, the first frame 120 is provided at the outer side of the first and second mass bodies 110a and 110b so as to be spaced apart from the first and second mass bodies 110a and 110b. Here, the first frame 120 may have a rectangular frame shape in which it has a rectangular cavity formed at the center thereof; but is not limited thereto.

In addition, the first frame 120 is formed to have a thickness in a Z axis direction thinner than those of the second frame 150 provided at the outer side thereof and the first and second mass bodies 110a and 110b, which is to prevent deterioration of sensitivity according to the air damping.

Meanwhile, the first frame 120 is connected to the second frame 150 through the third and fourth flexible parts 160 and 170. Here, the first frame 120 is displaced based on the second frame 150 by bending of the third flexible part 160 and twisting of the fourth flexible part 170 when it is driven by a first driving unit 190. Here, the first frame 120 is rotated based on the Y axis with respect to the second frame 150. A detailed content associated with this will be described below. Meanwhile, in order to secure structural stability of the first frame 120, a first support part 125 may be provided between the first and second mass bodies 110a and 110b so as to transverse the first frame 120 in the Y axis direction. In addition, the first support part may be formed to have a thickness in the Z axis direction that is the same as that of the first frame.

The first and second flexible parts 130 and 140, which serve to connect the first frame 120 and the first and second mass bodies 110a and 110b to each other so that the first and second mass bodies 110a and 110b may be displaced based on the first frame 120, are formed to be perpendicular to each other. That is, the first flexible part 130 connects the first and second mass bodies 110a and 110b and the first frame 120 to each other in the Y axis direction, respectively, and the second flexible part 140 connects the first and second mass bodies 110a and 110b and the first frame 120 to each other in the X axis direction, respectively.

Meanwhile, as shown in FIGS. 3 to 5, the first flexible part 130 may have a width $w_1$ in the X axis direction larger than a thickness $t_1$ in the Z axis direction, and the second flexible part 140 may have a thickness $t_2$ in the Z axis direction larger than a width $w_2$ in the Y axis direction. Due to these characteristics of the first and second flexible parts 130 and 140, the first and second mass bodies 110a and 110b are movable only in a specific direction based on the first frame 120.

Figure 6:
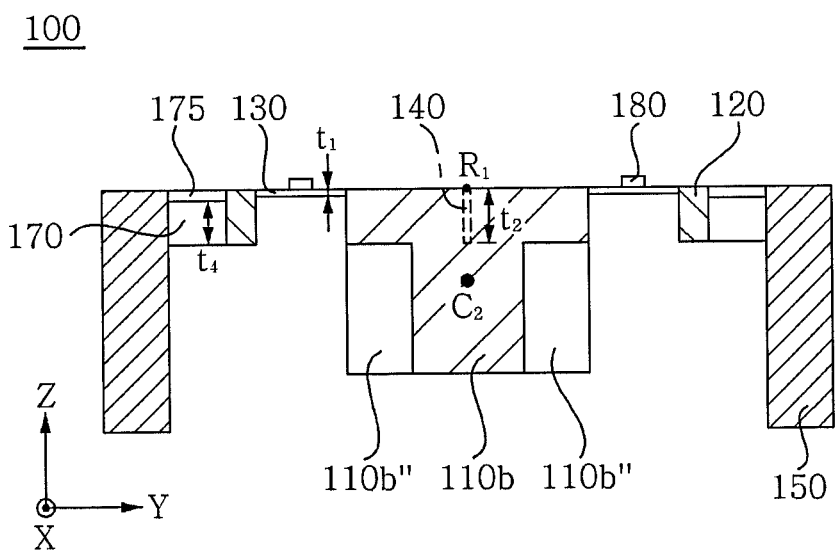
FIG. 6 is a cross-sectional view of the angular velocity sensor taken along the line B-B' of FIG. 3.
Figure 7:
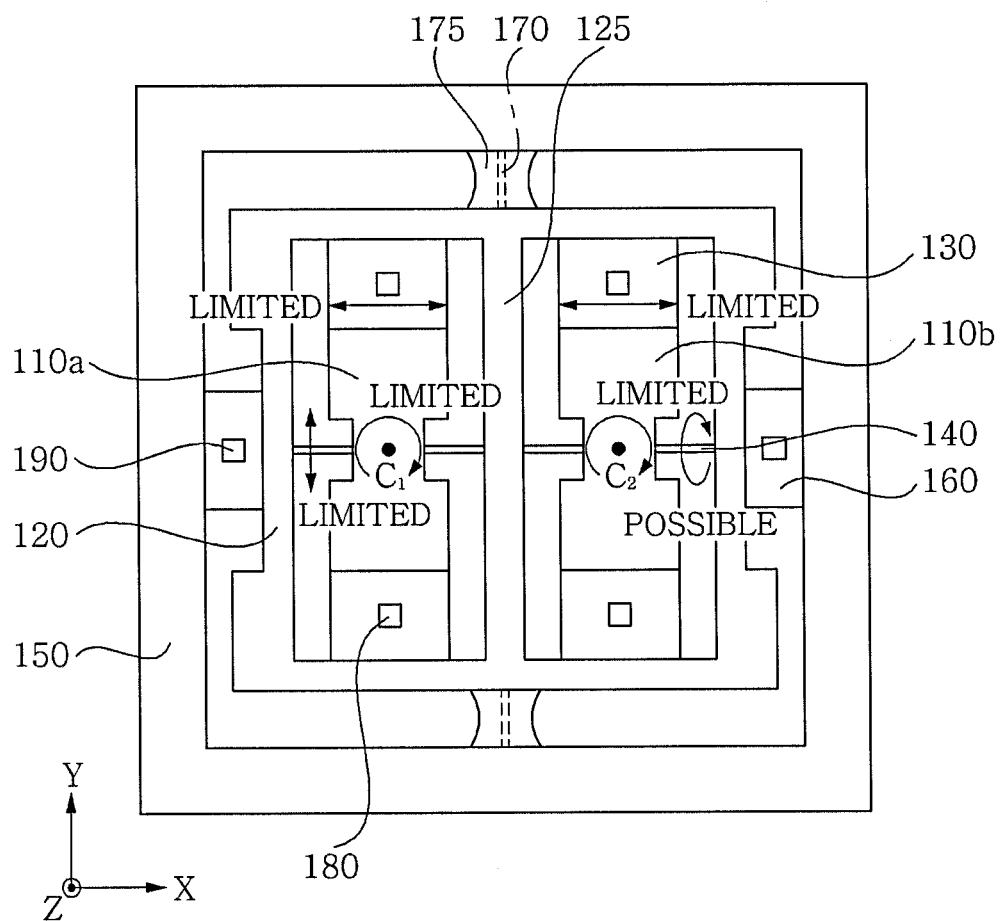
FIG. 7 is a plan view showing movable directions of first and second mass bodies shown in FIG. 3.
Figure 8:
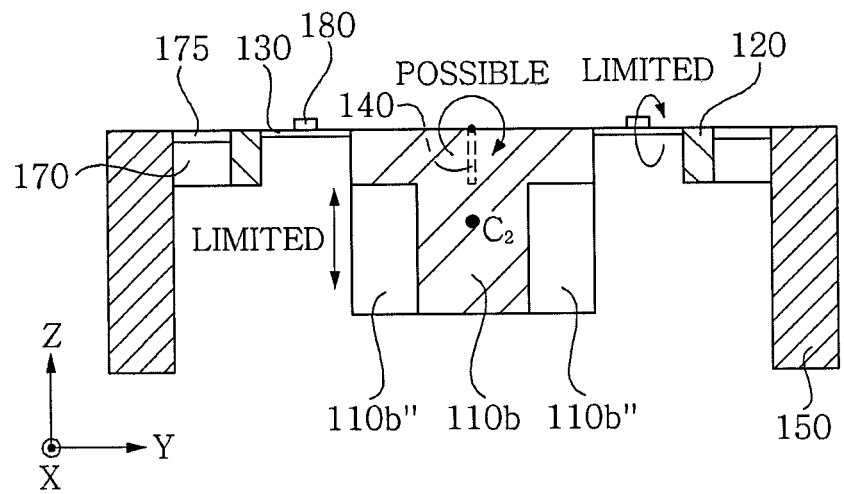
FIG. 8 is a cross-sectional view showing movable directions of first and second mass bodies shown in FIG. 6.

FIG. 7 is a plan view showing movable directions of first and second mass bodies shown in FIG. 3; and FIG. 8 is a cross-sectional view showing movable directions of first and second mass bodies shown in FIG. 6. Hereinafter, the movable directions of the first and second mass bodies 110a and 110b will be described with reference to FIGS. 7 and 8.

First, since the second flexible part 140 has the thickness $t_2$ in the Z axis direction larger than the width $w_2$ in the Y axis direction, the first and second mass bodies 110a and 110b are limited from being rotated based on the Y axis or translated in the Z axis direction, but may be relatively freely rotated based on the X axis, with respect to the first frame 120 (See FIG. 8).

More specifically, in the case in which rigidity of the second flexible part 140 at the time of rotation based on the Y axis is larger than rigidity of the second flexible part 140 at the time of rotation based on the X axis, the first and second mass bodies 110a and 110b may be freely rotated based on the X axis, but are limited from being rotated based on the Y axis. Similarly, in the case in which rigidity of the second flexible part 140 at the time of translation in the Z axis direction is larger than the rigidity of the second flexible part 140 at the time of the rotation based on the X axis, the first and second mass bodies 110a and 110b may be freely rotated based on the X axis, but are limited from being translated in the Z axis direction. Therefore, as a value of (the rigidity of the second flexible part 140 at the time of the rotation based on the Y axis or the rigidity of the second flexible part 140 at the time of the translation in the Z axis direction)/(the rigidity of the second flexible part 140 at the time of the rotation based on the X axis) increases, the first and second mass bodies 110a and 110b may be freely rotated based on the X axis, but are limited from being rotated based on the Y axis or translated in the Z axis direction, with respect to the first frame 120.

Relationships among the thickness $t_2$ of the second flexible part 140 in the Z axis direction, the length $L_1$ thereof in the X axis direction, the width $w_2$ thereof in the Y axis direction, and the rigidities thereof in each direction may be represented by the following Equations with reference to FIGS. 3 to 5.

(1) The rigidity of the second flexible part 140 at the time of the rotation based on the Y axis or the rigidity thereof at the time of the translation in the Z axis direction $\propto w_2 \times t_2^3/L_1^3$ (2) The rigidity of the second flexible part 140 at the time of the rotation based on the X axis $\propto w_2^3 \times t_2/L_1$ According to the above two Equations, the value of (the rigidity of the second flexible part 140 at the time of the rotation based on the Y axis or the rigidity of the second flexible part 140 at the time of the translation in the Z axis direction)/(the rigidity of the second flexible part 140 at the time of the rotation based on the X axis) is in proportion to $(t_2/(w_2 L_1))^2$. However, since the second flexible part 140 according to the present embodiment has the thickness $t_2$ in the Z axis direction larger than the width $w_2$ in the Y axis direction, $(t_2/(w_2 L_1))^2$ is large, such that the value of (the rigidity of the second flexible part 140 at the time of the rotation based on the Y axis or the rigidity of the second flexible part 140 at the time of the translation in the Z axis direction)/(the rigidity of the second flexible part 140 at the time of the rotation based on the X axis) increases. Due to these characteristics of the second flexible part 140, the first and second mass bodies 110a and 110b are freely rotated based on the X axis, but are limited from being rotated based on the Y axis or translated in the Z axis direction, with respect to the first frame 120.

Meanwhile, the first flexible part 130 has relatively very high rigidity in the length direction (Y axis direction), thereby making it possible to limit the first and second mass bodies 110a and 110b from being rotated based on the Z axis or translated in the Y axis direction, with respect to the first frame 120 (See FIG. 5). In addition, the second flexible part 140 has relatively very high rigidity in the length direction (the X axis direction), thereby making it possible to limit the first and second mass bodies 110a and 110b from being translated in the X axis direction with respect to the first frame 120 (See FIG. 7).

As a result, due to the characteristics of the first and second flexible parts 130 and 140 described above, the first and second mass bodies 110a and 110b may be rotated based on the X axis, but are limited from being rotated based on the Y or Z axis or translated in the Z, Y, or X axis direction, with respect to the first frame 120. That is, the movable directions of the first and second mass bodies 110a and 110b may be represented by the following Table 1.

TABLE 1

| Movable directions of first and second mass bodies (based on first frame) | Whether or not movement is possible |
|---|---|
| Rotation based on X axis | Possible |
| Rotation based on Y axis | Limited |
| Rotation based on Z axis | Limited |
| Translation in X axis direction | Limited |
| Translation in Y axis direction | Limited |
| Translation in Z axis direction | Limited |

As described above, since the first and second mass bodies 110a and 110b may be rotated based on the X axis, but are limited from being moved in the remaining directions, with respect to the first frame 120, the first and second mass bodies 110a and 110b may be allowed to be displaced only with respect to force in a desired direction (the rotation based on the X axis).

Figure 9A:
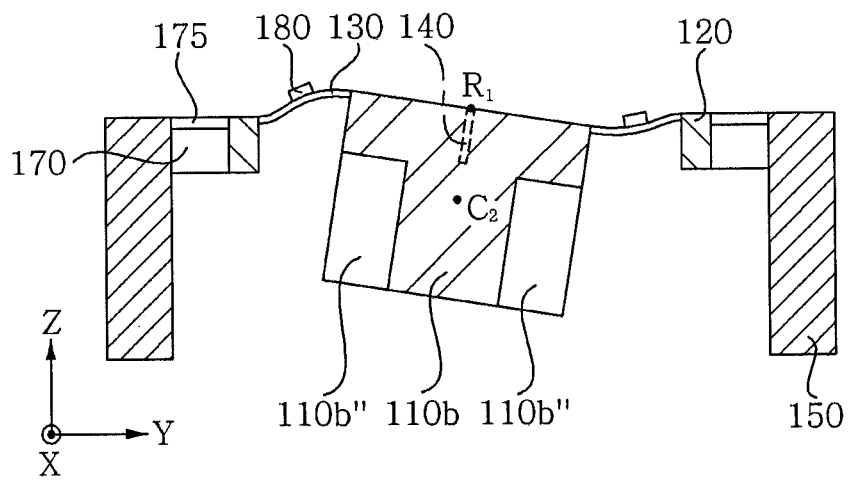
FIGS. 9A and 9B are cross-sectional views schematically showing a use state in which a second mass body shown in FIG. 6 is rotated based on an X axis with respect to a first frame.
Figure 9B:
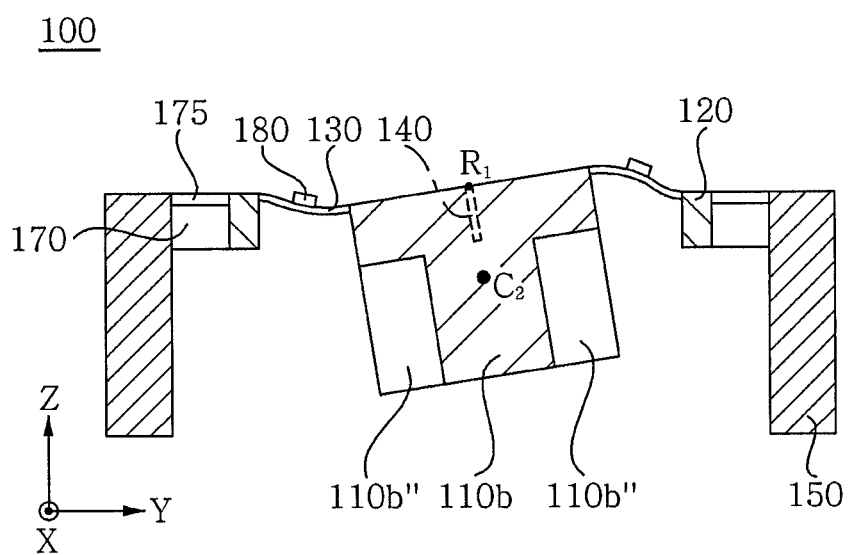

Meanwhile, FIGS. 9A and 9B are cross-sectional views showing a process in which a second mass body shown in FIG. 6 is rotated based on an X axis with respect to a first frame. As shown in FIGS. 9A and 9B, since the second mass body 110b is rotated based on the X axis as a rotation axis $R_1$ with respect to the first frame 120, bending stress in which compression stress and tension stress are combined with each other is generated in the first flexible part 130, and twisting stress is generated based on the X axis in the second flexible part 140. In this case, in order to generate a torque in the second mass body 110b, the second flexible part 140 may be disposed over the center $C_2$ of gravity of the second mass body 110b based on the Z axis direction. In addition, similar to the second mass body 110b, in order to generate a torque in the first mass body 110a, the second flexible part 140 may be disposed over the center $C_1$ of gravity of the first mass body 110a based on the Z axis direction. Meanwhile, as shown in FIG. 3, in order to allow the first and second mass bodies 110a and 110b to be accurately rotated based on the X axis, the second flexible part 140 may be disposed at a position corresponding to the center $C_1$ of gravity of the first mass body 110a and the center $C_2$ of gravity of the second mass body 110b based on the X axis direction.

The second frame 150 supports the third and fourth flexible parts 160 and 170 to allow a space in which the first frame 120 may be displaced to be secured and becomes a basis when the first frame 120 is displaced. Here, the second frame 150 is provided at the outer side of the first frame 120 so as to be spaced apart from the first frame 120. Here, the second frame 150 may have a square pillar shape in which it has a square pillar shaped cavity formed at the center thereof, but is not limited thereto.

The third and fourth flexible parts 160 and 170, which serve to connect the first and second frames 120 and 150 to each other so that the first frame 120 may be displaced based on the second frame 150, are formed to be perpendicular to each other. That is, the third flexible part 160 connects the first and second frames 120 and 150 to each other in the X axis direction, and the fourth flexible part 170 connects the first and second frames 120 and 150 to each other in the Y axis direction.

Meanwhile, as shown in FIGS. 3 to 6, the third flexible part 160 may have a width $w_3$ in the Y axis direction larger than a thickness $t_3$ in the Z axis direction, and the fourth flexible part 170 may have a thickness $t_4$ in the Z axis direction larger than a width $w_4$ in the X axis direction. Due to these characteristics of the third and fourth flexible parts 160 and 170, the first frame 120 is movable only in a specific direction based on the second frame 150.

Figure 10:
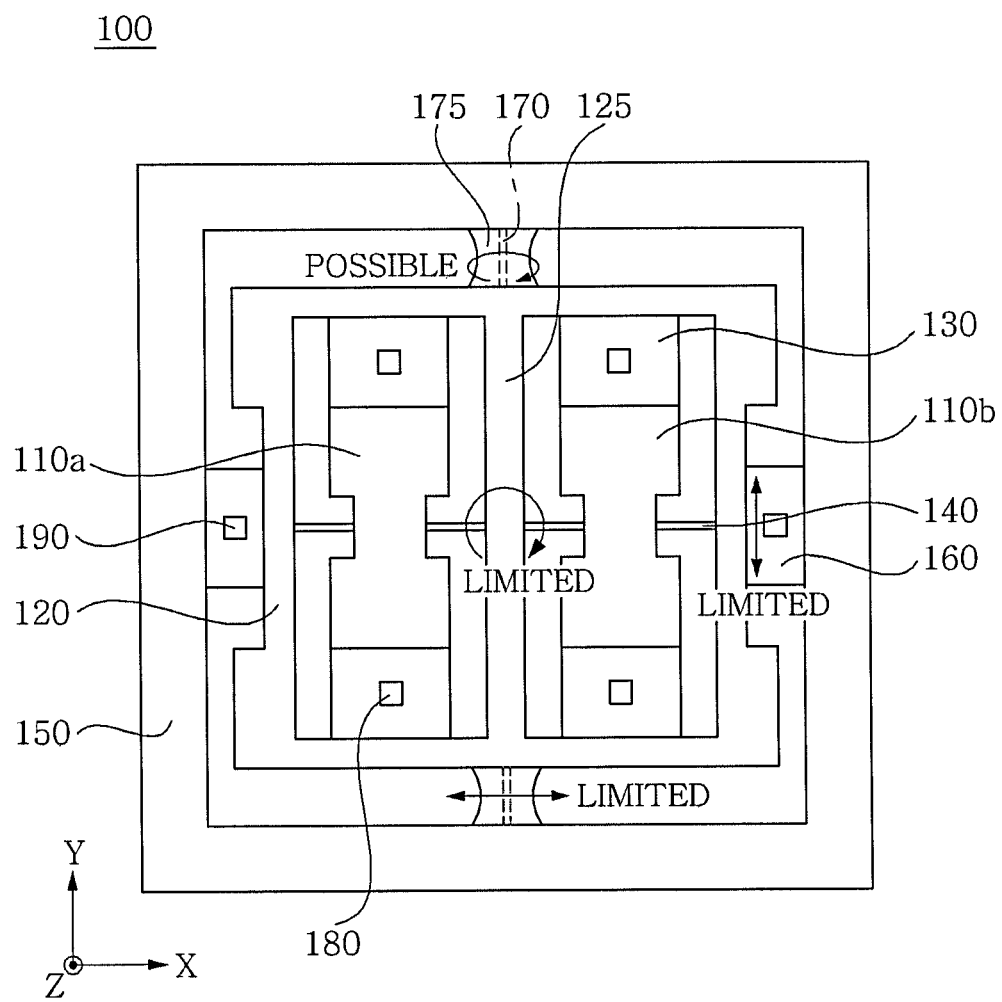
FIG. 10 is a plan view showing movable directions of a first frame shown in FIG. 3.
Figure 11:
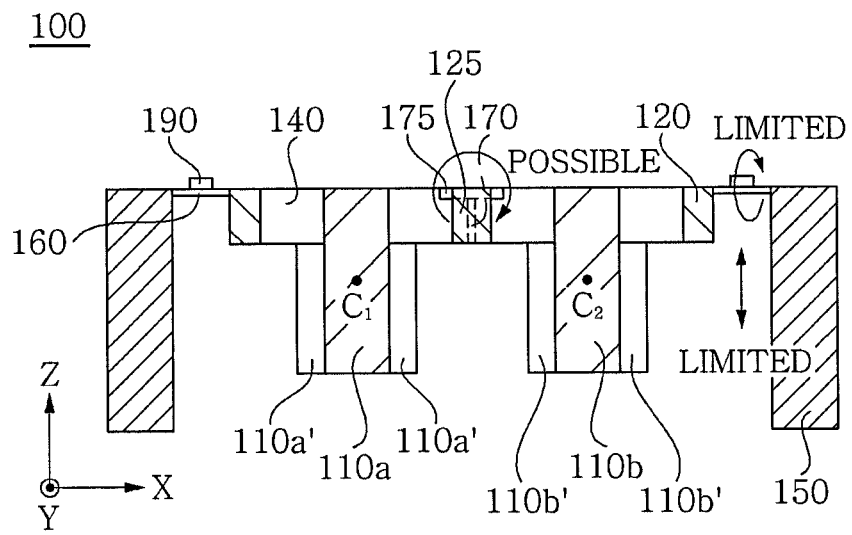
FIG. 11 is a cross-sectional view showing movable directions of a first frame shown in FIG. 5.

FIG. 10 is a plan view showing movable directions of a first frame shown in FIG. 3; and FIG. 11 is a cross-sectional view showing movable directions of a first frame shown in FIG. 5. Hereinafter, the movable directions of the first frame 120 will be described with reference to FIGS. 10 and 11.

First, since the fourth flexible part 170 has the thickness $t_4$ in the Z axis direction larger than the width $w_4$ in the X axis direction, the first frame 120 is limited from being rotated based on the X axis or translated in the Z axis direction, but may be relatively freely rotated based on the Y axis, with respect to the second frame 150 (See FIG. 11).

More specifically, in the case in which rigidity of the fourth flexible part 170 at the time of rotation based on the X axis is larger than rigidity of the fourth flexible part 170 at the time of rotation based on the Y axis, the first frame 120 may be freely rotated based on the Y axis, but are limited from being rotated based on the X axis. Similarly, in the case in which rigidity of the fourth flexible part 170 at the time of translation in the Z axis direction is larger than the rigidity of the fourth flexible part 170 at the time of the rotation based on the Y axis, the first frame 120 may be freely rotated based on the Y axis, but are limited from being translated in the Z axis direction. Therefore, as a value of (the rigidity of the fourth flexible part 170 at the time of the rotation based on the X axis or the rigidity of the fourth flexible part 170 at the time of the translation in the Z axis direction)/(the rigidity of the fourth flexible part 170 at the time of the rotation based on the Y axis) increases, the first frame 120 may be freely rotated based on the Y axis, but are limited from being rotated based on the X axis or translated in the Z axis direction, with respect to the second frame 150.

Relationships among the thickness $t_4$ of the fourth flexible part 170 in the Z axis direction, the length $L_2$ thereof in the Y axis direction, the width $w_4$ thereof in the X axis direction, and the rigidities thereof in each direction may be represented by the following Equations with reference to FIGS. 3 and 6.

(1) The rigidity of the fourth flexible part 170 at the time of the rotation based on the X axis or the rigidity thereof at the time of the translation in the Z axis direction $\propto w_4 \times t_4^3 / L_2^3$ (2) The rigidity of the fourth flexible part 170 at the time of the rotation based on the Y axis $\propto w_4^3 \times t_4 / L_2$ According to the above two Equations, the value of (the rigidity of the fourth flexible part 170 at the time of the rotation based on the X axis or the rigidity of the fourth flexible part 170 at the time of the translation in the Z axis direction)/(the rigidity of the fourth flexible part 170 at the time of the rotation based on the Y axis) is in proportion to $(t_4/(w_4 L_2))^2$. However, since the fourth flexible part 170 according to the present embodiment has the thickness $t_4$ in the Z axis direction larger than the width $w_4$ in the X axis direction, $(t_4/(w_4 L_2))^2$ is large, such that the value of (the rigidity of the fourth flexible part 170 at the time of the rotation based on the X axis or the rigidity of the fourth flexible part 170 at the time of the translation in the Z axis direction)/(the rigidity of the fourth flexible part 170 at the time of the rotation based on the Y axis) increases. Due to these characteristics of the fourth flexible part 170, the first frame 120 is rotated based on the Y axis, but is limited from being rotated based on the X axis or translated in the Z axis direction, with respect to the second frame 150.

Meanwhile, the third flexible part 160 has relatively very high rigidity in the length direction (the X axis direction), thereby making it possible to limit the first frame 120 from being rotated based on the Z axis or translated in the X axis direction, with respect to the second frame 150 (See FIG. 8).

In addition, the fourth flexible part 170 has relatively very high rigidity in the length direction (the Y axis direction), thereby making it possible to limit the first frame 120 from being translated in the Y axis direction, with respect to the second frame 150 (See FIG. 10).

As a result, due to the characteristics of the third and fourth flexible parts 160 and 170 described above, the first frame 120 may be rotated based on the Y axis, but are limited from being rotated based on the X or Z axis or translated in the Z, Y, or X axis direction, with respect to the second frame 150. That is, the movable directions of the first frame 120 may be represented by the following Table 2.

TABLE 2

| Movable directions of first frame (based on second frame) | Whether or not movement is possible |
| --- | --- |
| Rotation based on X axis | Limited |
| Rotation based on Y axis | Possible |
| Rotation based on Z axis | Limited |
| Translation in X axis direction | Limited |
| Translation in Y axis direction | Limited |
| Translation in Z axis direction | Limited |

As described above, since the first frame 120 may be rotated based on the Y axis, but is limited from being moved in the remaining directions, with respect to the second frame 150, the first frame 120 may be allowed to be displaced only with respect to force in a desired direction (the rotation based on the Y axis).

Figure 12A:
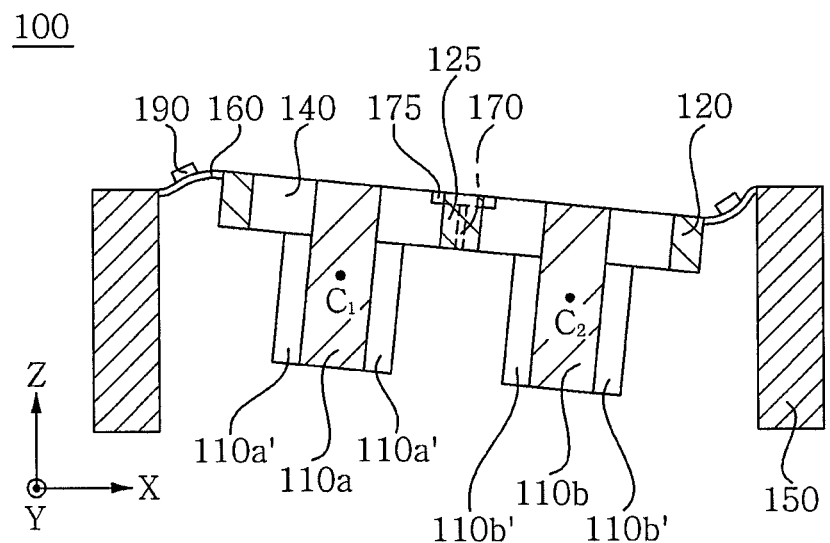
FIGS. 12A and 12B are cross-sectional views schematically showing a use state in which a first frame shown in FIG. 5 is rotated based on a Y axis with respect to a second frame.
Figure 12B:
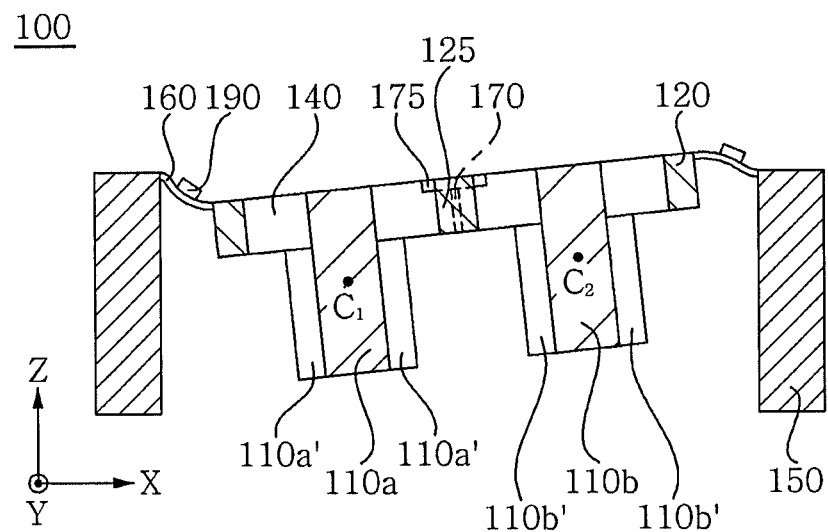

FIGS. 12A and 12B are cross-sectional views showing a process in which a first frame shown in FIG. 5 is rotated based on a Y axis with respect to a second frame. As shown in FIGS. 12A and 12B, since the first frame 120 is rotated based on the Y axis with respect to the second frame 150, bending stress in which compression stress and tension stress are combined with each other is generated in the third flexible part 160, and twisting stress is generated based on the Y axis in the fourth flexible part 170.

Additionally, as shown in FIG. 3, when viewed based on an XY plane, the first flexible part 130 is relatively wide, but the second flexible part 140 is relatively narrow. Therefore, the first flexible part 130 may be provided with a first sensing unit 180 sensing the displacement of the first and second mass bodies 110a and 110b. Here, the first sensing unit 180 may sense the displacement of the first and second mass bodies 110a and 110b rotated based on the X axis. Here, the first sensing unit 180 may be formed in a piezoelectric scheme, a piezoresistive scheme, a capacitive scheme, an optical scheme, or the like, but is not particularly limited thereto.

In addition, when viewed based on the XY plane, the third flexible part 160 is relatively wide, but the fourth flexible part 170 is relatively narrow. Therefore, the third flexible part 160 may be provided with a first driving unit 190 driving the first frame 120. Here, the first driving unit 190 may drive the first frame 120 so as to be rotated based on the Y axis. Here, the first driving unit 190 may be formed in a piezoelectric scheme, a capacitive scheme, or the like, but is not particularly limited thereto.

Additionally, an upper portion of the fourth flexible 170 may be provided with a first membrane 175 so as to connect the first and second frames 120 and 150 to each other. Here, the first membrane 175 has a width larger than the width $w_4$ of the fourth flexible part 170. That is, the first membrane 175 may be formed in a plate shape and vertically meet the fourth flexible part 170 to form a "T" shape when viewed in a cross section as shown in FIG. 3. Here, the first membrane 175 may provide a region through which a wiring (not shown) extended from the first sensing unit 180 passes.

Meanwhile, the angular velocity sensor 100 according to the present embodiment may measure angular velocity using the above-mentioned structural characteristics. FIGS. 13A to 14D are cross-sectional views showing a process in which the angular velocity sensor according to the preferred embodiment of the present invention measure angular velocity. The process of measuring angular velocity will be described with reference to FIGS. 13A to 14D.

Figure 13A:
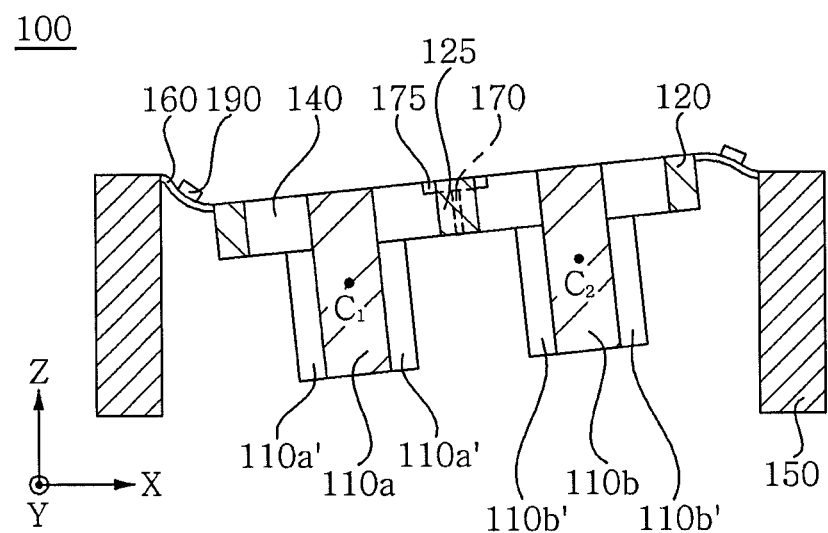
FIGS. 13A to 14D are cross-sectional views schematically showing a process in which the angular velocity sensor according to the preferred embodiment of the present invention measures angular velocity.
Figure 13B:
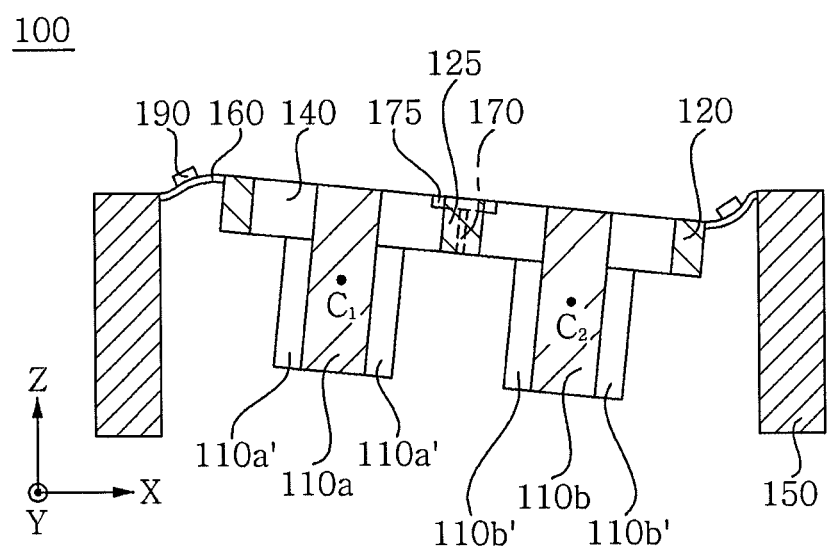

First, as shown in FIGS. 13A and 13B, the first frame 120 is rotated based on the Y axis with respect to the second frame 150 using the first driving unit 190 (driving mode). Here, the first and second mass bodies 110a and 110b vibrate while being rotated together with the first frame 120 based on the Y axis, and displacement is generated in the first and second mass bodies 110a and 110b due to the vibration. More specifically, displacement (+X, −Z) in a +X axis direction and a −Z axis direction is generated in the first mass body 110a and at the same time, displacement (+X, +Z) in the +X axis direction and a +Z axis direction is generated in the second mass body 110b (See FIG. 13A). Then, displacement (−X, +Z) in a −X axis direction and the +Z axis direction is generated in the first mass body 110a and at the same time, displacement (−X, −Z) in the −X axis direction and the −Z axis direction is generated in the second mass body 110b (See FIG. 13B). Here, when angular velocity rotated based on the X or Z axis is applied to the first and second mass bodies 110a and 110b, Coriolis force is generated.

Due to the Coriolis force, as shown in FIGS. 14A to 14D, the first and second mass bodies 110a and 110b are displaced while being rotated based on the X axis with respect to the first frame 120, and the first sensing unit 180 senses the displacement of the first and second mass bodies 110a and 110b (sensing mode).

Figure 14A:
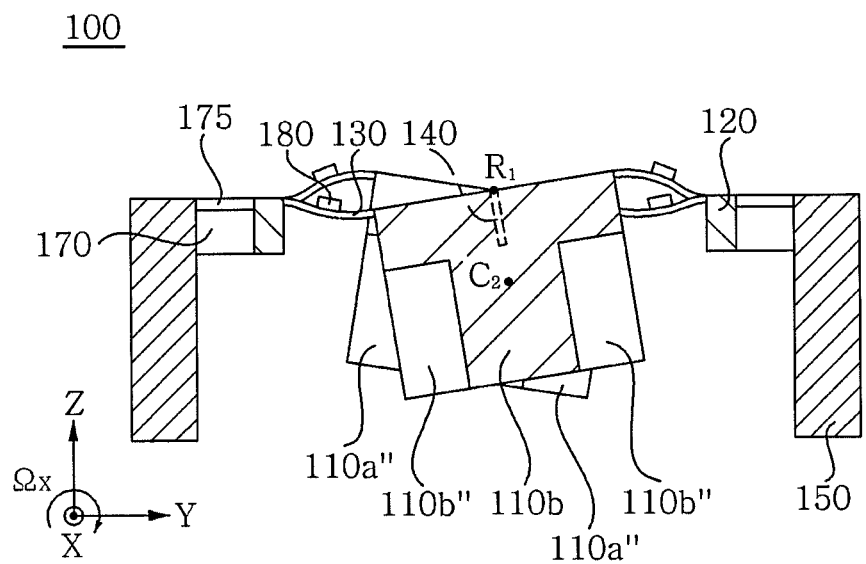
Figure 14B:
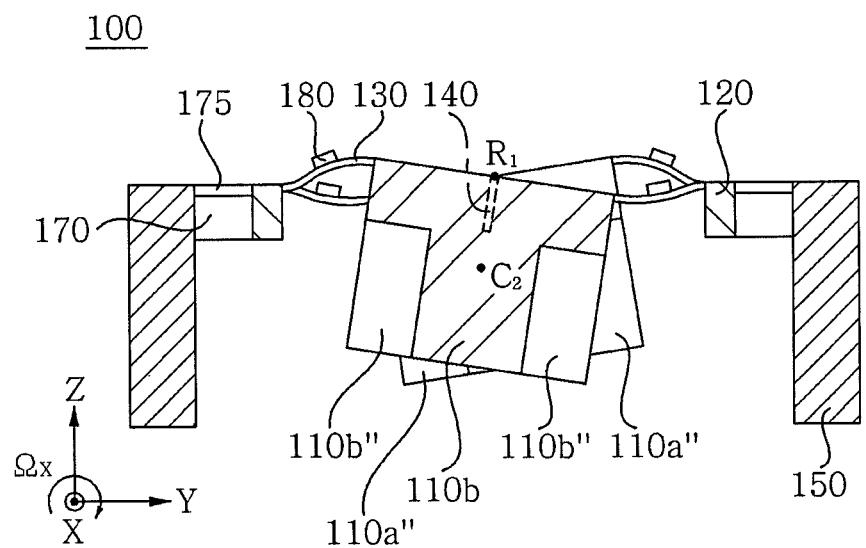

More specifically, as shown in FIGS. 14A and 14B, when angular velocity rotated based on the X axis is applied to the first and second mass bodies 110a and 110b, Coriolis force is generated in a −Y axis direction and then generated in a +Y axis direction in the first mass body 110a, and Coriolis force is generated in the +Y axis direction and then generated in the −Y axis direction in the second mass body 110b. Therefore, the first and second mass bodies 110a and 110b are rotated based on the X axis in directions opposite to each other, the first sensing unit 180 may sense the displacement of the first and second mass bodies 110a and 110b to calculate the Coriolis force, and angular velocity rotated based on the X axis may be measured through the Coriolis force. In this case, when signals each generated in two first flexible parts 130 (first sensing units 180) connected to the first mass body 110a are defined as SY1 and SY2 and signals each generated in two first flexible parts 130 (first sensing units 180) connected to the second mass body 110b are defined as SY3 and SY4, angular velocity rotated based on the X axis may be calculated from (SY1-SY2)−(SY3-SY4). As described above, since the signals are differentially output between the first and second mass bodies 110a and 110b rotated in the directions opposite to each other, acceleration noise may be offset.

Figure 14C:
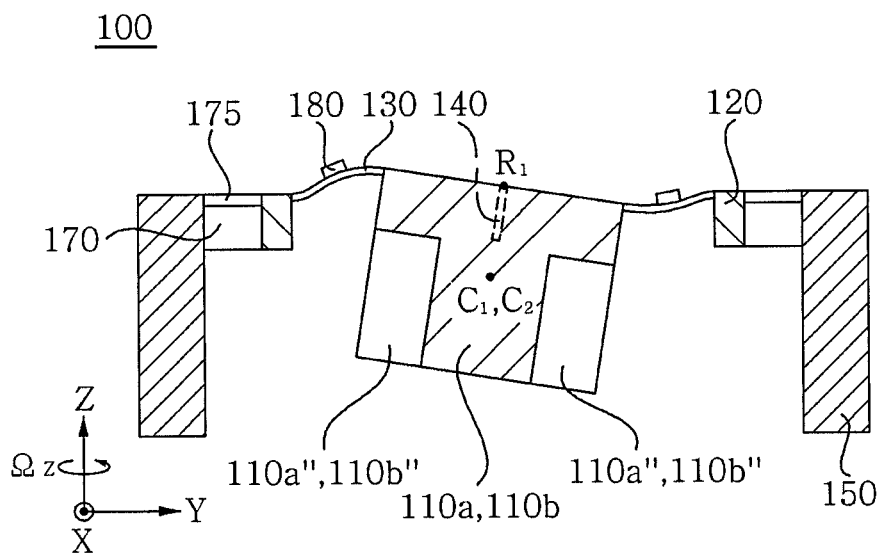
Figure 14D:
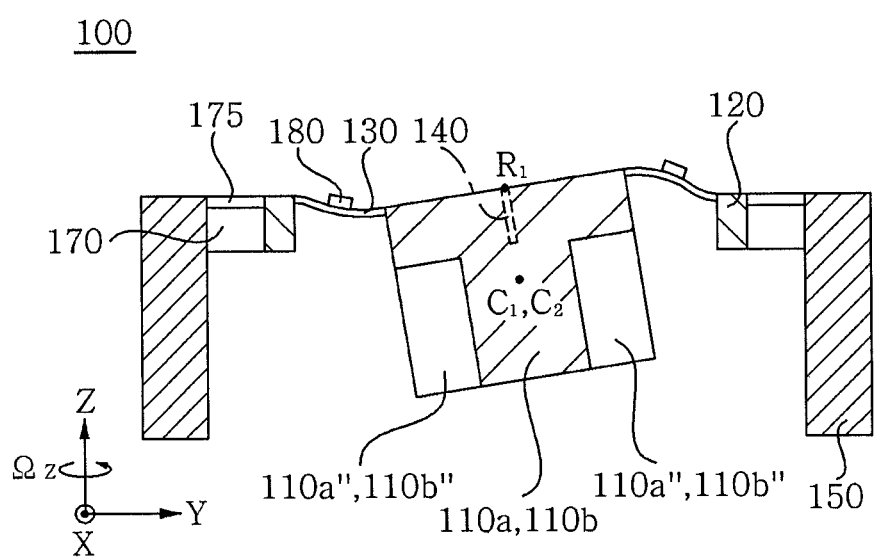

In addition, as shown in FIGS. 14C and 14D, when angular velocity rotated based on the Z axis is applied to the first and second mass bodies 110a and 110b, Coriolis force is generated in the −Y axis direction and then generated in the +Y axis direction in the first mass body 110a, and Coriolis force is generated in the −Y axis direction and then generated in the +Y axis direction in the second mass body 110b. Therefore, the first and second mass bodies 110a and 110b are rotated based on the X axis in the same direction as each other, the first sensing unit 180 may sense the displacement of the first and second mass bodies 110a and 110b to calculate the Coriolis force, and angular velocity rotated based on the Z axis may be measured through the Coriolis force. In this case, when signals each generated in two first flexible parts 130 (first sensing units 180) connected to the first mass body 110a are defined as SY1 and SY2 and signals each generated in two first flexible parts 130 (first sensing units 180) connected to the second mass body 110b are defined as SY3 and SY4, angular velocity rotated based on the Z axis may be calculated from (SY1-SY2)+(SY3-SY4).

As a result, the angular velocity sensor 100 according to the present embodiment may measure the angular velocity rotated based on the X or Z axis through the first sensing unit 180. That is, the angular velocity sensor 100 according to the present embodiment may measure angular velocity of two axes including the X axis and the Z axis.

Meanwhile, due to the characteristics of the first and second flexible parts 130 and 140 described above, the first and second mass bodies 110a and 110b may be rotated only based on the X axis with respect to the first frame 120. Therefore, as shown in FIGS. 13A and 13B, even though the first frame 120 is rotated based on the Y axis with respect to the second frame 150 using the first driving unit 190, the first and second mass bodies 110a and 110b are not rotated based on the Y axis with respect to the first frame 120. In addition, due to the characteristics of the third and fourth flexible parts 160 and 170 described above, the first frame 120 may be rotated only based on the Y axis with respect to the second frame 150.

Therefore, as shown in FIGS. 14A to 14D, when the displacement of the first and second mass bodies 110a and 110b is sensed using the first sensing unit 180, even though the Coriolis force in the Y axis direction acts, the first frame 120 is not rotated based on the X axis with respect to the second frame 150, and only the first and second mass bodies 110a and 110b are rotated based on the X axis with respect to the first frame 120.

As described above, the angular velocity sensor 100 according to the present embodiment includes the first and second frames 120 and 150 to individually generate the driving displacement and the sensing displacement of the first and second mass bodies 110a and 110b, and includes the first to fourth flexible parts 130, 140, 160, and 170 formed so that the first and second mass bodies 110a and 110b and the first frame 120 are movable only in a specific direction. Therefore, interference between the driving mode and the sensing mode is removed to increase a circuit amplification ratio, thereby making it possible to improve sensitivity, and an effect due to a manufacturing error is decreased, thereby making it possible to improve a yield.

Figure 15:
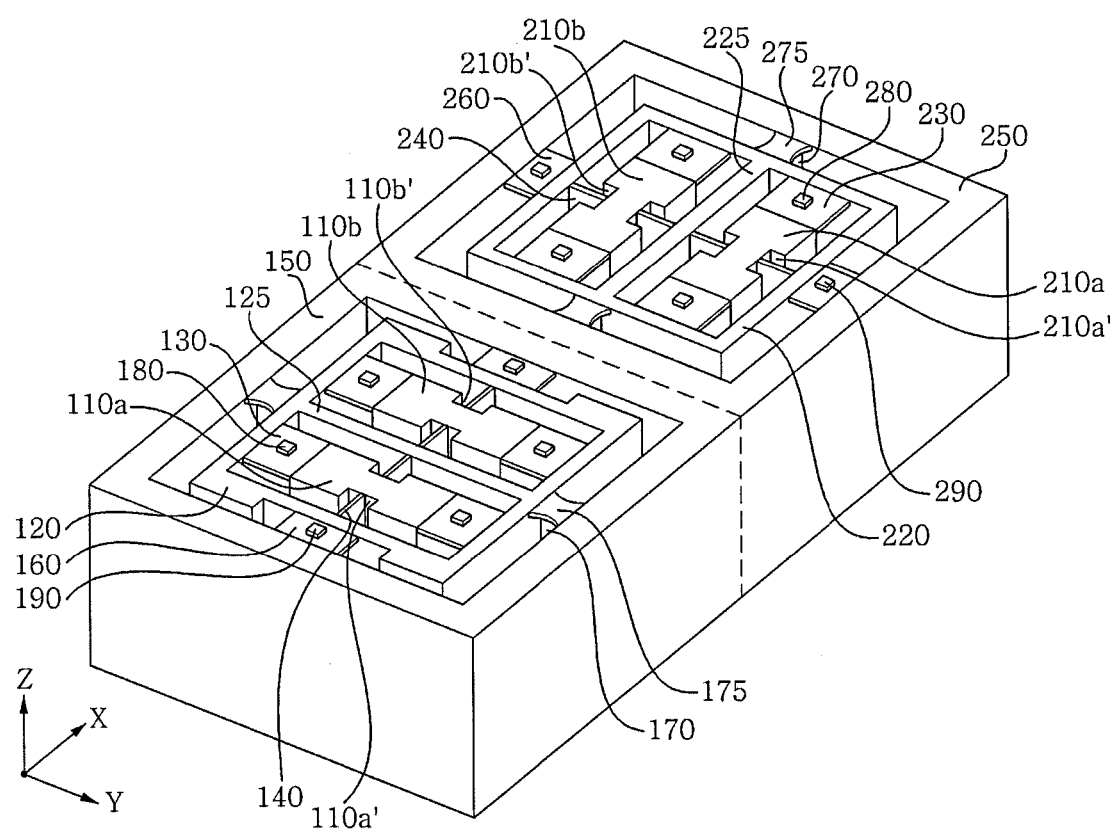
FIG. 15 is a perspective view of an angular velocity sensor according to a second preferred embodiment of the present invention.
Figure 16:
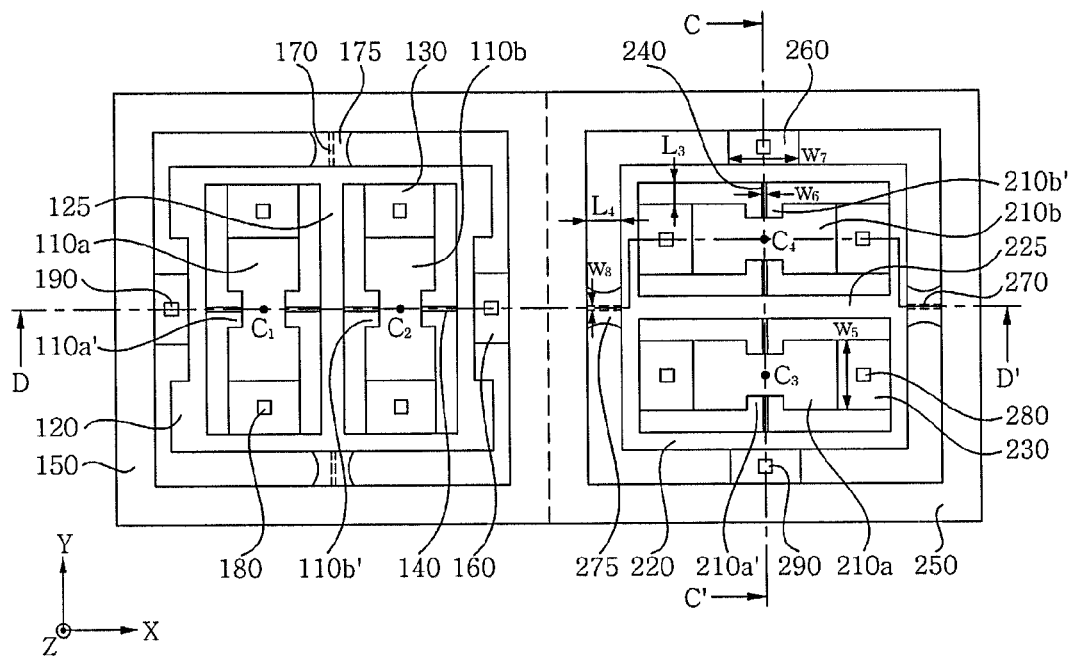
FIG. 16 is a plan view of the angular velocity sensor shown in FIG. 15.
Figure 17:
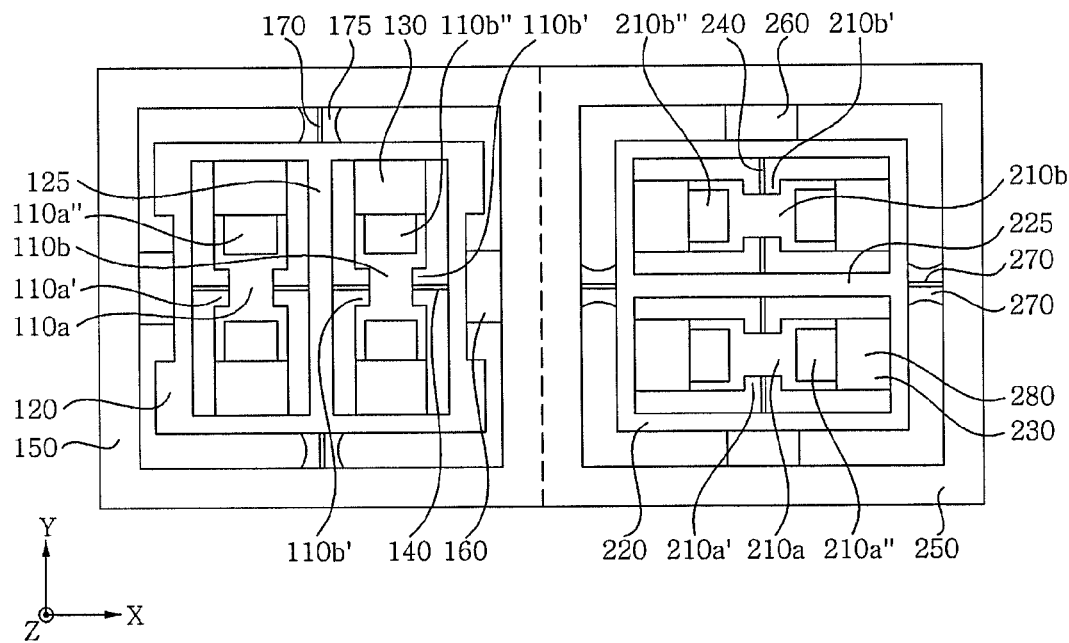
FIG. 17 is a bottom view of the angular velocity sensor shown in FIG. 15.
Figure 18:
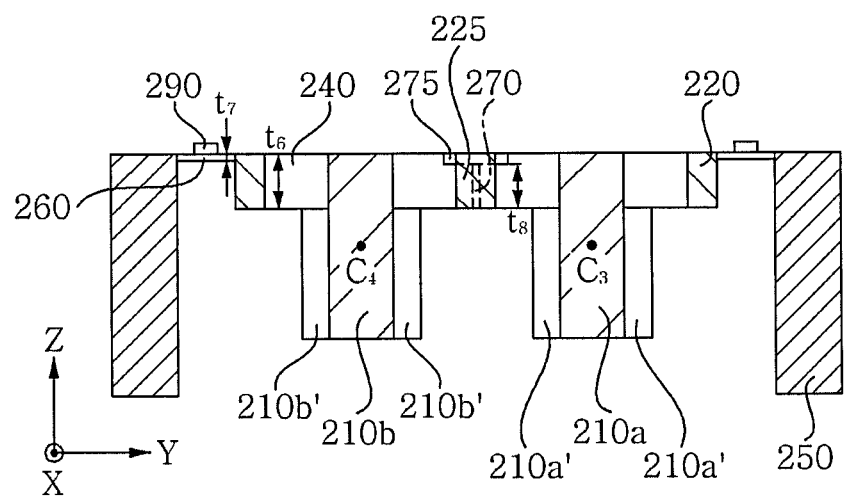
FIG. 18 is a cross-sectional view of the angular velocity sensor taken along the line C-C' of FIG. 16.
Figure 19:
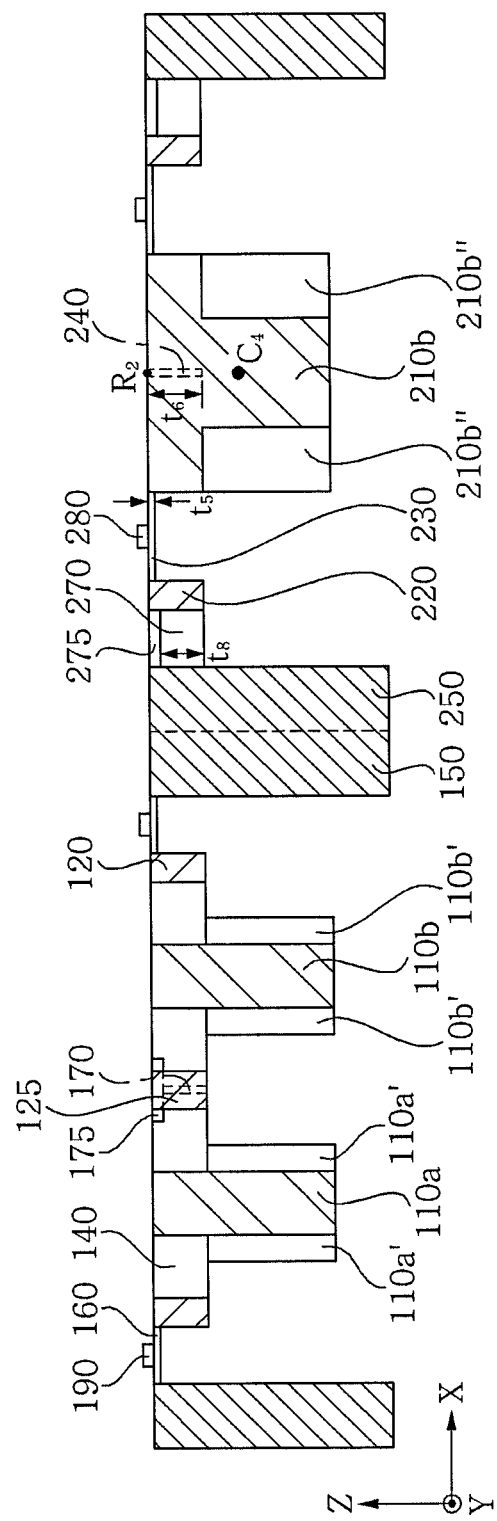
FIG. 19 is a cross-sectional view of the angular velocity sensor taken along the line D-D' of FIG. 16.

Next, FIG. 15 is a perspective view of an angular velocity sensor according to a second preferred embodiment of the present invention; FIG. 16 is a plan view of the angular velocity sensor shown in FIG. 15; FIG. 17 is a bottom view of the angular velocity sensor shown in FIG. 15; FIG. 18 is a cross-sectional view of the angular velocity sensor taken along the line C-C' of FIG. 16; and FIG. 19 is a cross-sectional view of the angular velocity sensor taken along the line D-D' of FIG. 16.

As shown in FIGS. 15 to 19, the angular velocity sensor according to the second preferred embodiment of the present invention is configured to include third and fourth mass bodies 210a and 210b, a third frame 220 provided at an outer side of the third and fourth mass bodies 210a and 210b so as to be spaced apart from the third and fourth mass bodies 210a and 210b, a fifth flexible part 230 connecting the third and fourth mass bodies 210a and 210b to the third frame 220 in the X axis direction, respectively, a sixth flexible part 240 connecting the third and fourth mass bodies 210a and 210b to the third frame 220 in the Y axis direction, respectively, a fourth frame 250 provided at an outer side of the third frame 220 so as to be spaced apart from the third frame 220, a seventh flexible part 260 connecting the third and fourth frames 220 and 250 to each other in the Y axis direction, and an eighth flexible part 270 connecting the third and fourth frames 220 and 250 to each other in the X axis direction, in addition to the first and second mass bodies 110a and 110b, the first and second frames 120 and 150, and the first to fourth flexible parts 130, 140, 160, and 170, wherein the third and fourth mass bodies 210a and 210b are disposed at both sides of the eighth flexible part 270 based on the Y axis direction, respectively, and the fourth frame 250 is disposed at a side of the second frame 150.

That is, the angular velocity sensor according to the second preferred embodiment of the present invention further includes the third and fourth mass bodies 210a and 210b, the third and fourth frames 220 and 250, and the fifth to eighth flexible parts 230, 240, 260, and 270, as compared with the angular velocity sensor 100 according to the first preferred embodiment of the present invention described above. Therefore, in the angular velocity sensor according to the second preferred embodiment of the present invention, a description of contents overlapped with those of the angular velocity sensor 100 according to the first preferred embodiment of the present invention described above will be omitted, and the third and fourth mass bodies 210a and 210b, the third and fourth frames 220 and 250, and the fifth to eighth flexible parts 230, 240, 260, and 270 will be mainly described.

The third and fourth mass bodies 210a and 210b, which are disposed to be perpendicular to the first and second mass bodies in the X or Y axis direction and are displaced by Coriolis force, may be connected to the third frame 220 through the fifth and sixth flexible parts 230 and 240 and be disposed to be in parallel with each other. Here, the third and fourth mass bodies 210a and 210b are displaced based on the third frame 220 by bending of the fifth flexible part 230 and twisting of the sixth flexible part 240 when Coriolis force acts thereon. Here, the third and fourth mass bodies 210a and 210b are rotated based on the Y axis with respect to the third frame 220. A detailed content associated with this will be described below. Meanwhile, although the case in which the third and fourth mass bodies 210a and 210b have a substantially square pillar shape is shown, the third and fourth mass bodies 210a and 210b are not limited to having the above-mentioned shape, but may have all shapes known in the art.

In addition, the third and fourth mass bodies 210a and 210b have the substantially square pillar shape and include first step parts 210a' and 210b' and second step parts 210a" and 210b" depressed so as to be stepped inwardly, respectively, similar to the first and second mass bodies 110a and 110b.

More specifically, the first step parts 210a' and 210b' are formed at connection parts at which the third and fourth mass bodies 210a and 210b are connected to the sixth flexible part 240, respectively, which is to increase a length of the sixth flexible part 240, thereby increasing displacement and detection sensitivity of the third and fourth mass bodies 210a and 210b.

In addition, the second step parts 210a" and 210b" are formed at connection part sides at which the third and fourth mass bodies 210a and 210b are connected to the fifth flexible part 230, respectively, which is to prevent deterioration of sensitivity according to air damping of the mass bodies.

Further, the first step parts 210a' and 210b' and the second step parts 210a" and 210b" are formed to be symmetrical to each other in one direction and the other direction of the third and fourth mass bodies 210a and 110b.

Meanwhile, although the case in which the third and fourth mass bodies 210a and 210b have the substantially square pillar shape as described above is shown, the third and fourth mass bodies 210a and 210b are not limited to having the above-mentioned shape, but may have all shapes known in the art.

The third frame 220 supports the fifth and sixth flexible parts 230 and 240 to allow a space in which the third and fourth mass bodies 210a and 210b may be displaced to be secured and becomes a basis when the third and fourth mass bodies 210a and 210b are displaced. Here, the third frame 220 is provided at the outer side of the third and fourth mass bodies 210a and 210b so as to be spaced apart from the third and fourth mass bodies 210a and 210b. Here, the third frame 220 may have a square pillar shape in which it has a square pillar shaped cavity formed at the center thereof, but is not limited thereto. In addition, the third frame may be formed to have a thickness in a Z axis direction thinner than those of the fourth frame and the third and fourth mass bodies.

Meanwhile, the third frame 220 is connected to the fourth frame 250 through the seventh and eighth flexible parts 260 and 270. Here, the third frame 220 is displaced based on the fourth frame 250 by bending of the seventh flexible part 260 and twisting of the eighth flexible part 270 when it is driven by a second driving unit 290. Here, the third frame 220 is rotated based on the X axis with respect to the fourth frame 250. A detailed content associated with this will be described below. Meanwhile, in order to secure structural stability of the third frame 220, a second support part 225 may be provided between the third and fourth mass bodies 210a and 210b so as to transverse the third frame 220 in the X axis direction.

In addition, the second support part 225 may be formed to have a thickness in the Z axis direction that is the same as that of the third frame.

The fifth and sixth flexible parts 230 and 240, which serve to connect the third frame 220 and the third and fourth mass bodies 210a and 210b to each other so that the third and fourth mass bodies 210a and 210b may be displaced based on the third frame 220, are formed to be perpendicular to each other. That is, the fifth flexible part 230 connects the third and fourth mass bodies 210a and 210b and the third frame 220 to each other in the X axis direction, respectively, and the sixth flexible part 240 connects the third and fourth mass bodies 210a and 210b and the third frame 220 to each other in the Y axis direction, respectively.

Meanwhile, as shown in FIGS. 16 to 19, the fifth flexible part 230 may have a width $w_5$ in the Y axis direction larger than a thickness $t_5$ in the Z axis direction, and the sixth flexible part 240 may have a thickness $t_6$ in the Z axis direction larger than a width $w_6$ in the X axis direction. Due to these characteristics of the fifth and sixth flexible parts 230 and 240, the third and fourth mass bodies 210a and 210b are movable only in a specific direction based on the third frame 220.

Figure 20:
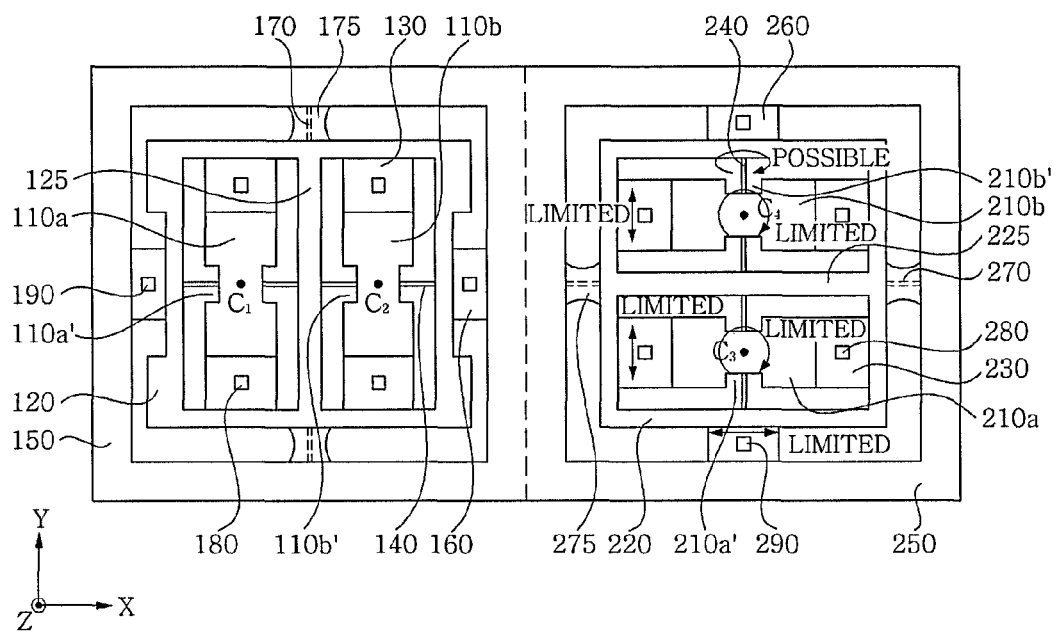
FIG. 20 is a plan view showing movable directions of third and fourth mass bodies shown in FIG. 16.
Figure 21:
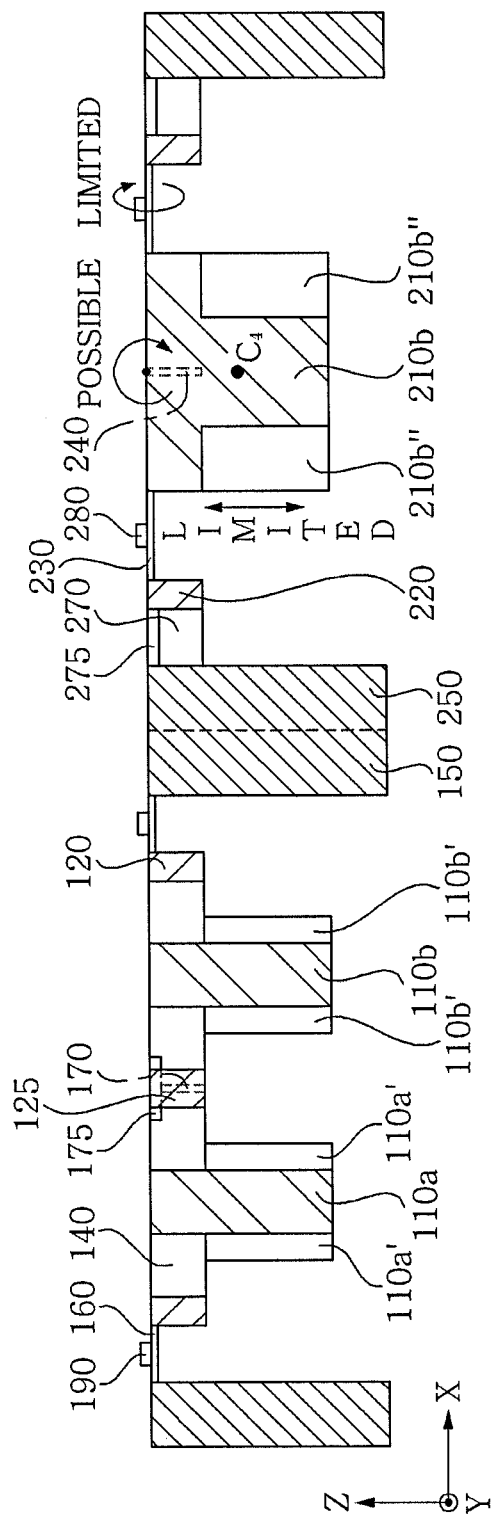
FIG. 21 is a cross-sectional view showing movable directions of third and fourth mass bodies shown in FIG. 19.

FIG. 20 is a plan view showing movable directions of third and fourth mass bodies shown in FIG. 16; and FIG. 21 is a cross-sectional view showing movable directions of third and fourth mass bodies shown in FIG. 19. Hereinafter, the movable directions of the third and fourth mass bodies 210a and 210b will be described with reference to FIGS. 20 and 21.

First, since the sixth flexible part 240 has the thickness $t_6$ in the Z axis direction larger than the width $w_6$ in the X axis direction, the third and fourth mass bodies 210a and 210b are limited from being rotated based on the X axis or translated in the Z axis direction, but may be relatively freely rotated based on the Y axis, with respect to the third frame 220 (See FIG. 21).

More specifically, in the case in which rigidity of the sixth flexible part 240 at the time of rotation based on the X axis is larger than rigidity of the sixth flexible part 240 at the time of rotation based on the Y axis, the third and fourth mass bodies 210a and 210b may be freely rotated based on the Y axis, but are limited from being rotated based on the X axis. Similarly, in the case in which rigidity of the sixth flexible part 240 at the time of translation in the Z axis direction is larger than the rigidity of the sixth flexible part 240 at the time of the rotation based on the Y axis, the third and fourth mass bodies 210a and 210b may be freely rotated based on the Y axis, but are limited from being translated in the Z axis direction. Therefore, as a value of (the rigidity of the sixth flexible part 240 at the time of the rotation based on the X axis or the rigidity of the sixth flexible part 240 at the time of the translation in the Z axis direction)/(the rigidity of the sixth flexible part 240 at the time of the rotation based on the Y axis) increases, the third and fourth mass bodies 210a and 210b may be freely rotated based on the Y axis, but are limited from being rotated based on the X axis or translated in the Z axis direction, with respect to the third frame 220.

Relationships among the thickness $t_6$ of the sixth flexible part 240 in the Z axis direction, the length $L_3$ thereof in the Y axis direction, the width $w_6$ thereof in the X axis direction, and the rigidities thereof in each direction may be represented by the following Equations with reference to FIGS. 16 and 19.

(1) The rigidity of the sixth flexible part 240 at the time of the rotation based on the X axis or the rigidity thereof at the time of the translation in the Z axis direction $\propto w_6 \times t_6^3 / L_3^3$ (2) The rigidity of the sixth flexible part 240 at the time of the rotation based on the Y axis $\propto W_6^3 \times t_6 / L_3$ According to the above two Equations, the value of (the rigidity of the sixth flexible part 240 at the time of the rotation based on the X axis or the rigidity of the sixth flexible part 240 at the time of the translation in the Z axis direction)/(the rigidity of the sixth flexible part 240 at the time of the rotation based on the Y axis) is in proportion to $(t_6/(w_6 L_3))^2$. However, since the sixth flexible part 240 according to the present embodiment has the thickness $t_6$ in the Z axis direction larger than the width $w_6$ in the X axis direction, $(t_6/(w_6 L_3))^2$ is large, such that the value of (the rigidity of the sixth flexible part 240 at the time of the rotation based on the X axis or the rigidity of the sixth flexible part 240 at the time of the translation in the Z axis direction)/(the rigidity of the sixth flexible part 240 at the time of the rotation based on the Y axis) increases. Due to these characteristics of the sixth flexible part 240, the third and fourth mass bodies 210a and 210b are freely rotated based on the Y axis, but are limited from being rotated based on the X axis or translated in the Z axis direction, with respect to the third frame 220.

Meanwhile, the fifth flexible part 230 has relatively very high rigidity in the length direction (X axis direction), thereby making it possible to limit the third and fourth mass bodies 210a and 210b from being rotated based on the Z axis or translated in the X axis direction, with respect to the third frame 220 (See FIG. 20). In addition, the sixth flexible part 240 has relatively very high rigidity in the length direction (the Y axis direction), thereby making it possible to limit the third and fourth mass bodies 210a and 210b from being translated in the Y axis direction with respect to the third frame 220 (See FIG. 20).

As a result, due to the characteristics of the fifth and sixth flexible parts 230 and 240 described above, the third and fourth mass bodies 210a and 210b may be rotated based on the Y axis, but are limited from being rotated based on the X or Z axis or translated in the Z, Y, or X axis direction, with respect to the third frame 220. That is, the movable directions of the third and fourth mass bodies 210a and 210b may be represented by the following Table 3.

TABLE 3

| Movable directions of third and fourth mass bodies (based on third frame) | Whether or not movement is possible |
| --- | --- |
| Rotation based on X axis | Limited |
| Rotation based on Y axis | Possible |
| Rotation based on Z axis | Limited |
| Translation in X axis direction | Limited |
| Translation in Y axis direction | Limited |
| Translation in Z axis direction | Limited |

As described above, since the third and fourth mass bodies 210a and 210b may be rotated based on the Y axis, but are limited from being moved in the remaining directions, with respect to the third frame 220, the third and fourth mass bodies 210a and 210b may be allowed to be displaced only with respect to force in a desired direction (the rotation based on the Y axis).

Figure 22A:
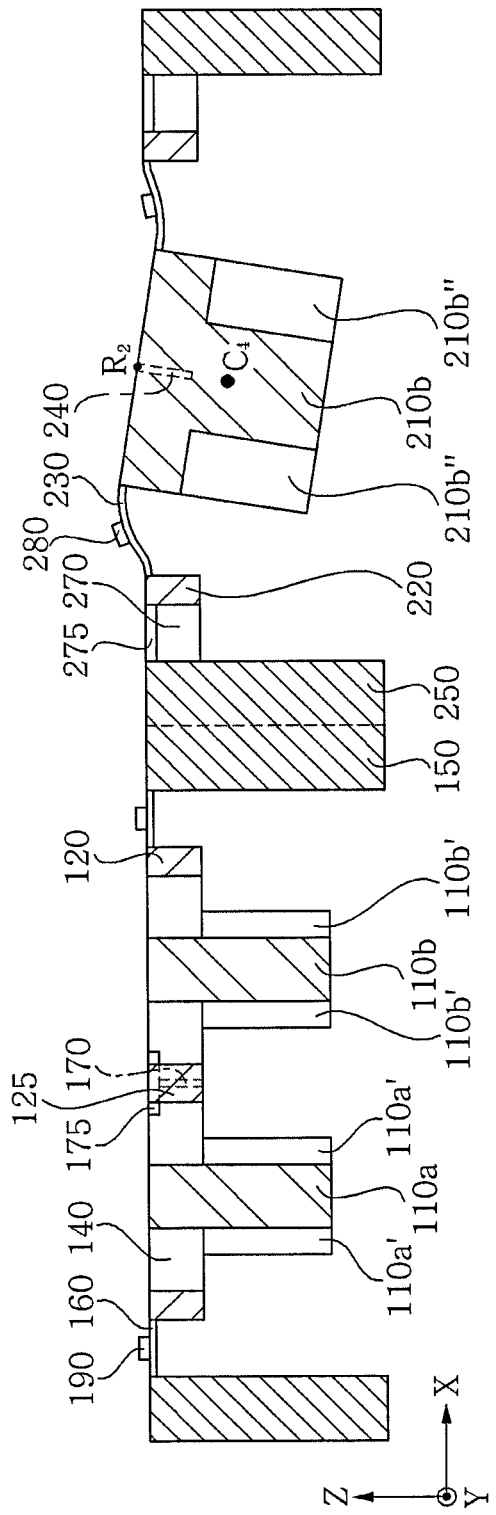
FIGS. 22A and 22B are cross-sectional views showing a process in which a fourth mass body shown in FIG. 19 is rotated based on a Y axis with respect to a third frame.
Figure 22B:
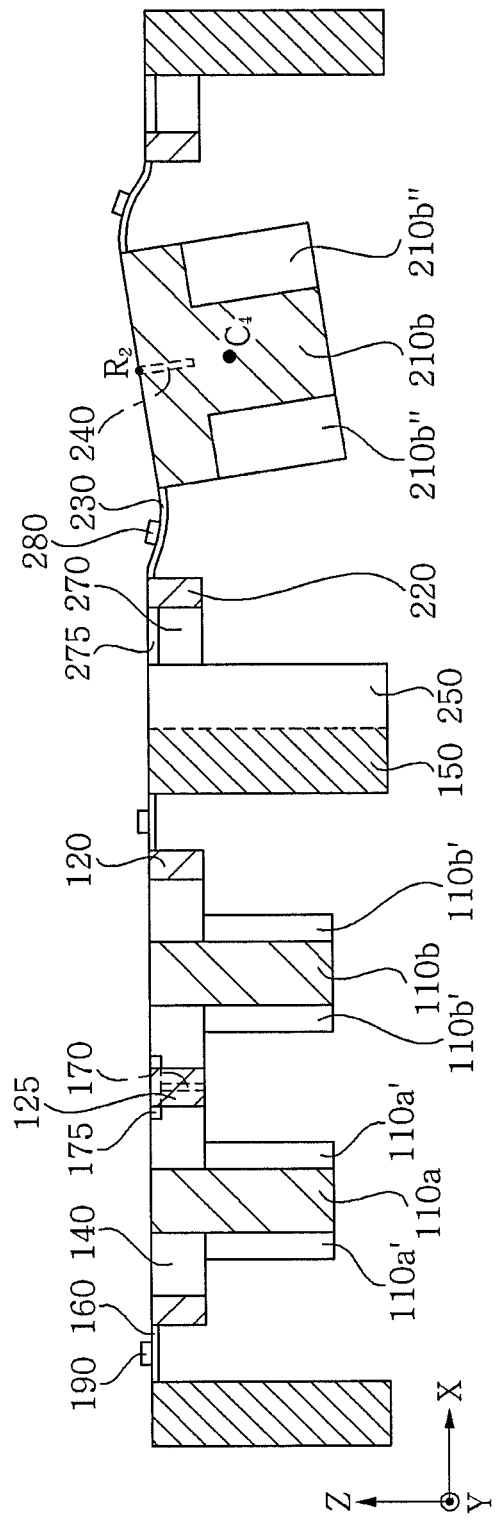

Meanwhile, FIGS. 22A and 22B are cross-sectional views showing a process in which a fourth mass body shown in FIG. 19 is rotated based on a Y axis with respect to a third frame. As shown in FIGS. 22A and 22B, since the fourth mass body 210b is rotated based on the Y axis as a rotation axis $R_2$ with respect to the third frame, bending stress in which compression stress and tension stress are combined with each other is generated in the fifth flexible part 230, and twisting stress is generated based on the Y axis in the sixth flexible part 240.

In this case, in order to generate a torque in the fourth mass body 210b, the sixth flexible part 240 may be disposed over the center $C_4$ of gravity of the fourth mass body 210b based on the Z axis direction. In addition, similar to the fourth mass body 210b, in order to generate a torque in the third mass body 210a, the sixth flexible part 240 may be disposed over the center $C_3$ of gravity of the third mass body 210a based on the Z axis direction. Meanwhile, in order to allow the third and fourth mass bodies 210a and 210b to be accurately rotated based on the Y axis, the sixth flexible part 240 may be disposed at a position corresponding to the center $C_3$ of gravity of the third mass body 210a and the center $C_4$ of gravity of the fourth mass body 210b based on the Y axis direction.

The fourth frame 250 supports the seventh and eighth flexible parts 260 and 270 to allow a space in which the third frame 220 may be displaced to be secured and becomes a basis when the third frame 220 is displaced. Here, the fourth frame 250 is provided at the outer side of the third frame 220 so as to be spaced apart from the third frame 220. Here, the fourth frame 250 may have a square pillar shape in which it has a square pillar shaped cavity formed at the center thereof; but is not limited thereto. Meanwhile, the fourth frame 250 may be disposed at the side of the second frame 150. Here, the fourth frame 250 is not necessarily distinguished from the second frame 150, but may also be formed integrally with the second frame 150. In addition, internal components corresponding to each other between the fourth frame 250 and the second frame 150 are disposed to be perpendicular to each other.

The seventh and eighth flexible parts 260 and 270, which serve to connect the third and fourth frames 220 and 250 to each other so that the third frame 220 may be displaced based on the fourth frame 250, are formed to be perpendicular to each other. That is, the seventh flexible part 260 connects the third and fourth frames 220 and 250 to each other in the Y axis direction, and the eighth flexible part 270 connects the third and fourth frames 220 and 250 to each other in the X axis direction.

Meanwhile, as shown in FIGS. 16 to 19, the seventh flexible part 260 may have a width $w_7$ in the X axis direction larger than a thickness $t_7$ in the Z axis direction, and the eighth flexible part 270 may have a thickness $t_8$ in the Z axis direction larger than a width $w_8$ in the Y axis direction. Due to these characteristics of the seventh and eighth flexible parts 260 and 270, the third frame 220 is movable only in a specific direction based on the fourth frame 250.

Figure 23:
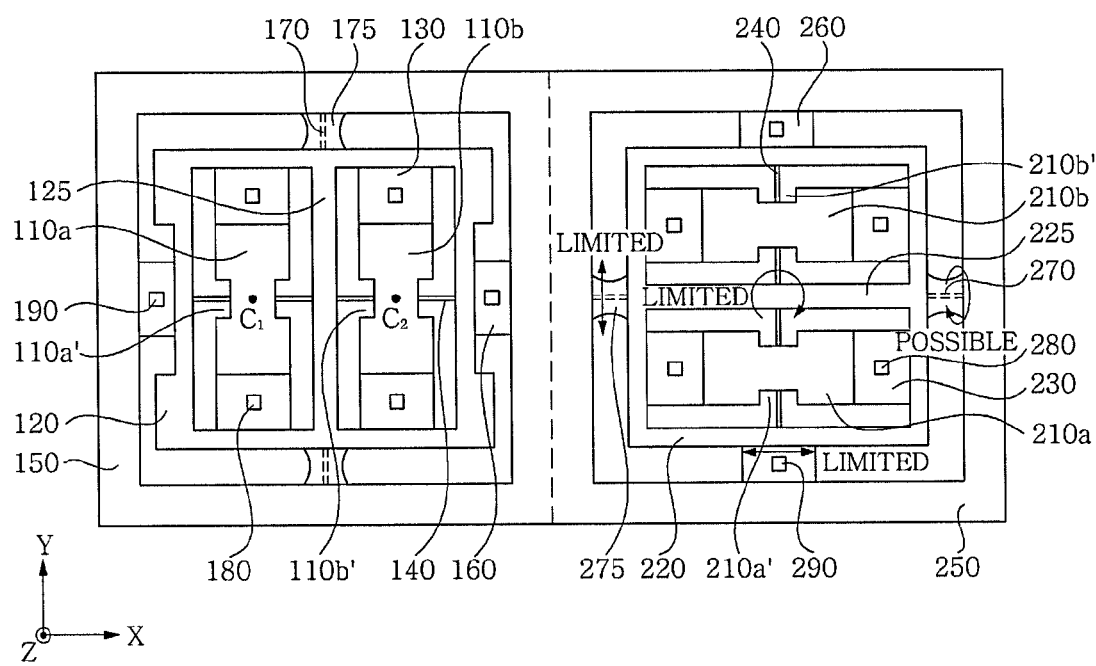
FIG. 23 is a plan view showing movable directions of a third frame shown in FIG. 16.
Figure 24:
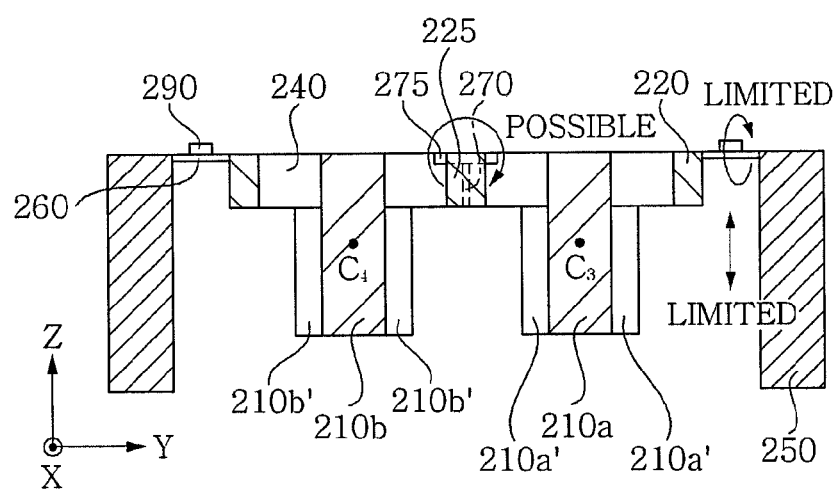
FIG. 24 is a cross-sectional view showing movable directions of a third frame shown in FIG. 18.

FIG. 23 is a plan view showing movable directions of a third frame shown in FIG. 16; and FIG. 24 is a cross-sectional view showing movable directions of a third frame shown in FIG. 18. Hereinafter, the movable directions of the third frame 220 will be described with reference to FIGS. 23 and 24.

First, since the eighth flexible part 270 has the thickness $t_8$ in the Z axis direction larger than the width $w_8$ in the Y axis direction, the third frame 220 is limited from being rotated based on the Y axis or translated in the Z axis direction, but may be relatively freely rotated based on the X axis, with respect to the fourth frame 250 (See FIG. 23).

More specifically, in the case in which rigidity of the eighth flexible part 270 at the time of rotation based on the Y axis is larger than rigidity of the eighth flexible part 270 at the time of rotation based on the X axis, the third frame 220 may be freely rotated based on the X axis, but are limited from being rotated based on the Y axis. Similarly, in the case in which rigidity of the eighth flexible part 270 at the time of translation in the Z axis direction is larger than the rigidity of the eighth flexible part 270 at the time of the rotation based on the X axis, the third frame 220 may be freely rotated based on the X axis, but are limited from being translated in the Z axis direction. Therefore, as a value of (the rigidity of the eighth flexible part 270 at the time of the rotation based on the Y axis or the rigidity of the eighth flexible part 270 at the time of the translation in the Z axis direction)/(the rigidity of the eighth flexible part 270 at the time of the rotation based on the X axis) increases, the third frame 220 may be freely rotated based on the X axis, but are limited from being rotated based on the Y axis or translated in the Z axis direction, with respect to the fourth frame 250.

Relationships among the thickness $t_8$ of the eighth flexible part 270 in the Z axis direction, the length $L_4$ thereof in the X axis direction, the width $w_8$ thereof in the Y axis direction, and the rigidities thereof in each direction may be represented by the following Equations with reference to FIGS. 16 and 19.

(1) The rigidity of the eighth flexible part 270 at the time of the rotation based on the Y axis or the rigidity thereof at the time of the translation in the Z axis direction $\propto w_8 \times t_8^3 / L_4^3$ (2) The rigidity of the eighth flexible part 270 at the time of the rotation based on the X axis $\propto w_8^3 \times t_8 / L^4$ According to the above two Equations, the value of (the rigidity of the eighth flexible part 270 at the time of the rotation based on the Y axis or the rigidity of the eighth flexible part 270 at the time of the translation in the Z axis direction)/(the rigidity of the eighth flexible part 270 at the time of the rotation based on the X axis) is in proportion to $(t_8/(w_8 L_4))^2$. However, since the eighth flexible part 270 according to the present embodiment has the thickness $t_8$ in the Z axis direction larger than the width $w_8$ in the Y axis direction, $(t_8/(w_8 L_4))^2$ is large, such that the value of (the rigidity of the eighth flexible part 270 at the time of the rotation based on the Y axis or the rigidity of the eighth flexible part 270 at the time of the translation in the Z axis direction)/(the rigidity of the eighth flexible part 270 at the time of the rotation based on the X axis) increases. Due to these characteristics of the eighth flexible part 270, the third frame 220 is rotated based on the X axis, but is limited from being rotated based on the Y axis or translated in the Z axis direction, with respect to the fourth frame 250.

Meanwhile, the seventh flexible part 260 has relatively very high rigidity in the length direction (the Y axis direction), thereby making it possible to limit the third frame 220 from being rotated based on the Z axis or translated in the Y axis direction, with respect to the fourth frame 250 (See FIG. 23). In addition, the eighth flexible part 270 has relatively very high rigidity in the length direction (the X axis direction), thereby making it possible to limit the third frame 220 from being translated in the X axis direction, with respect to the fourth frame 250 (See FIG. 23).

As a result, due to the characteristics of the seventh and eighth flexible parts 260 and 270 described above, the third frame 220 may be rotated based on the X axis, but are limited from being rotated based on the Y or Z axis or translated in the Z, Y, or X axis direction, with respect to the fourth frame 250. That is, the movable directions of the third frame 220 may be represented by the following Table 4.

TABLE 4

| Movable directions of third frame (based on fourth frame) | Whether or not movement is possible |
|---|---|
| Rotation based on X axis | Possible |
| Rotation based on Y axis | Limited |
| Rotation based on Z axis | Limited |
| Translation in X axis direction | Limited |
| Translation in Y axis direction | Limited |
| Translation in Z axis direction | Limited |

As described above, since the third frame 220 may be rotated based on the X axis, but is limited from being moved in the remaining directions, with respect to the fourth frame 250, the third frame 220 may be allowed to be displaced only with respect to force in a desired direction (the rotation based on the X axis).

Figure 25A:
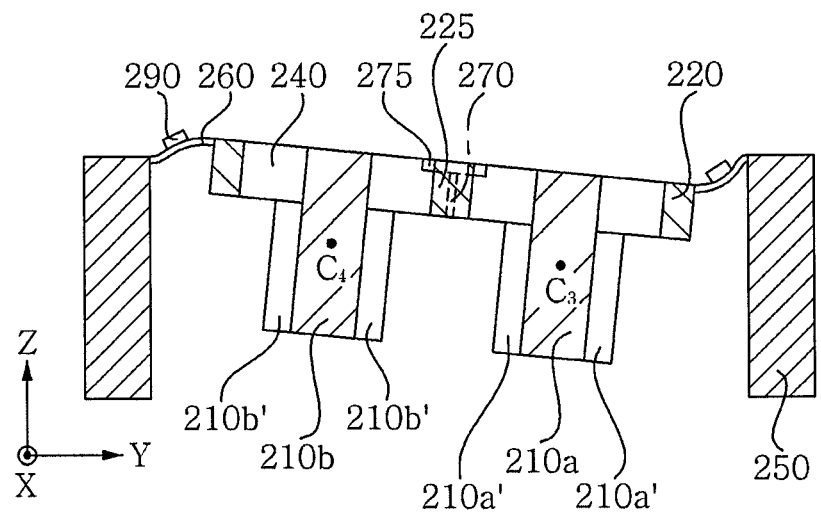
FIGS. 25A and 25B are cross-sectional views showing a process in which a third frame shown in FIG. 18 is rotated based on an X axis with respect to a fourth frame.
Figure 25B:
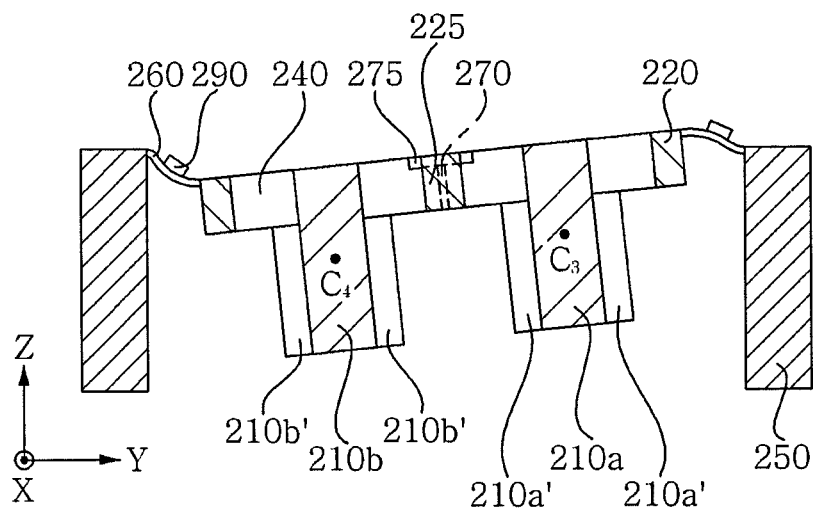

Meanwhile, FIGS. 25A and 25B are cross-sectional views showing a process in which a third frame shown in FIG. 18 is rotated based on an X axis with respect to a fourth frame. As shown in FIGS. 25A and 25B, since the third frame 220 is rotated based on the X axis with respect to the fourth frame 250, bending stress in which compression stress and tension stress are combined with each other is generated in the seventh flexible part 260, and twisting stress is generated based on the X axis in the eighth flexible part 270.

Additionally, as shown in FIG. 16, when viewed based on an XY plane, the fifth flexible part 230 is relatively wide, but the sixth flexible part 240 is relatively narrow. Therefore, the fifth flexible part 230 may be provided with a second sensing unit 280 sensing the displacement of the third and fourth mass bodies 210a and 210b. Here, the second sensing unit 280 may sense the displacement of the third and fourth mass bodies 210a and 210b rotated based on the Y axis. Here, the second sensing unit 280 may be formed in a piezoelectric scheme, a piezoresistive scheme, a capacitive scheme, an optical scheme, or the like, but is not particularly limited thereto.

In addition, when viewed based on the XY plane, the seventh flexible part 260 is relatively wide, but the eighth flexible part 270 is relatively narrow. Therefore, the seventh flexible part 260 may be provided with a second driving unit 290 driving the third frame 220. Here, the second driving unit 290 may drive the third frame 220 so as to be rotated based on the X axis. Here, the second driving unit 290 may be formed in a piezoelectric scheme, a capacitive scheme, or the like, but is not particularly limited thereto.

Additionally, an upper portion of the eighth flexible 270 may be provided with a second membrane 275 so as to connect the third and fourth frames 220 and 250 to each other. Here, the second membrane 275 has a width larger than the width $w_8$ of the eighth flexible part 270. That is, the second membrane 275 may be formed in a plate shape and vertically meet the eighth flexible part 270 to form a "T" shape when viewed in a cross section as shown in FIG. 18. Here, the second membrane 275 may provide a region through which a wiring (not shown) extended from the second sensing unit 280 passes.

Meanwhile, the angular velocity sensor according to the second preferred embodiment of the present invention may measure angular velocity using the above-mentioned structural characteristics. FIGS. 26A to 27D are cross-sectional views showing a process in which the angular velocity sensor according to the second preferred embodiment of the present invention measure angular velocity. The process of measuring angular velocity will be described with reference to FIGS. 26A to 27D.

Figure 26A:
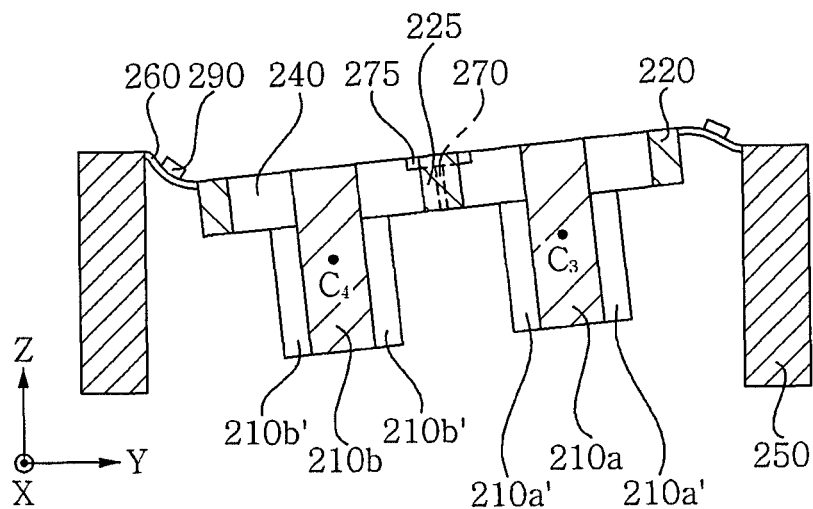
FIGS. 26A to 27D are cross-sectional views showing a process in which the angular velocity sensor according to the second preferred embodiment of the present invention measure angular velocity.
Figure 26B:
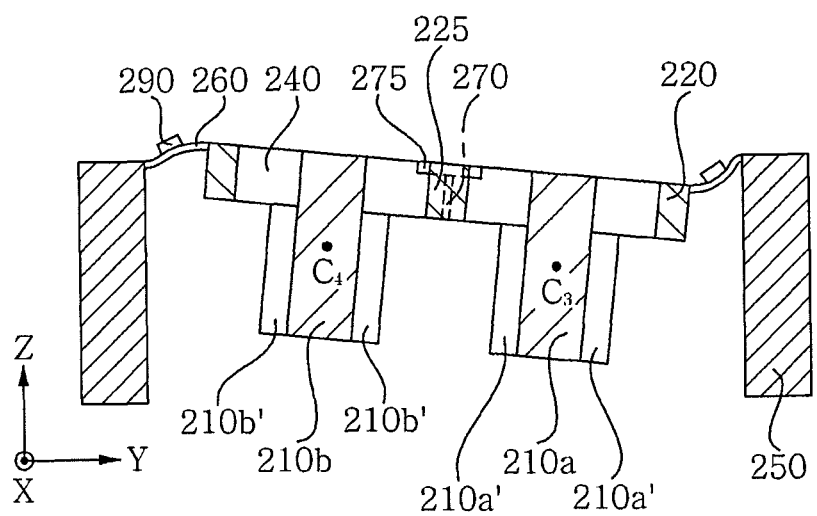

First, as shown in FIGS. 26A and 26B, the third frame 220 is rotated based on the X axis with respect to the fourth frame 250 using the second driving unit 290 (driving mode). Here, the third and fourth mass bodies 210a and 210b vibrate while being rotated together with the third frame 220 based on the X axis, and displacement is generated in the third and fourth mass bodies 210a and 210b due to the vibration. More specifically, displacement (+Y, +Z) in a +Y axis direction and a +Z axis direction is generated in the third mass body 210a and at the same time, displacement (+Y, −Z) in the +Y axis direction and a −Z axis direction is generated in the fourth mass body 210b (See FIG. 26A). Then, displacement (−Y, −Z) in a −Y axis direction and the −Z axis direction is generated in the third mass body 210a and at the same time, displacement (−Y, +Z) in the −Y axis direction and the +Z axis direction is generated in the fourth mass body 210b (See FIG. 26B). Here, when angular velocity rotated based on the Y or Z axis is applied to the third and fourth mass bodies 210a and 210b, Coriolis force is generated.

Due to the Coriolis force, as shown in FIGS. 27A to 27D, the third and fourth mass bodies 210a and 210b are displaced while being rotated based on the Y axis with respect to the third frame 220, and the second sensing unit 280 senses the displacement of the third and fourth mass bodies 210a and 210b (sensing mode).

Figure 27A:
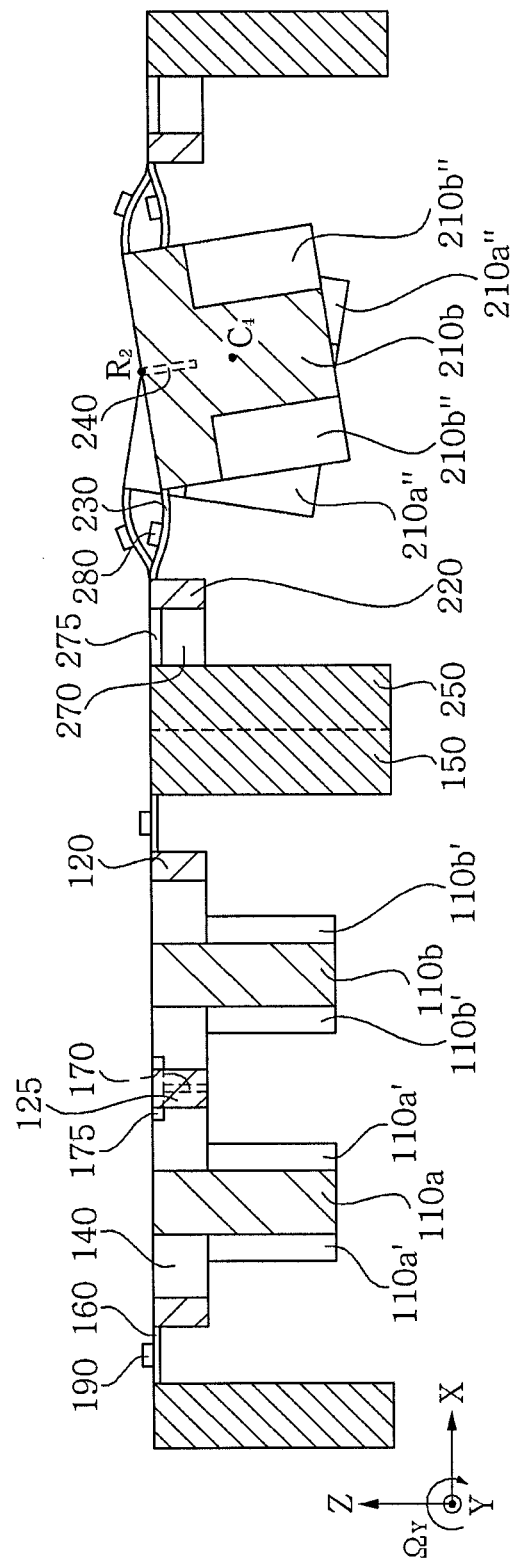
Figure 27B:
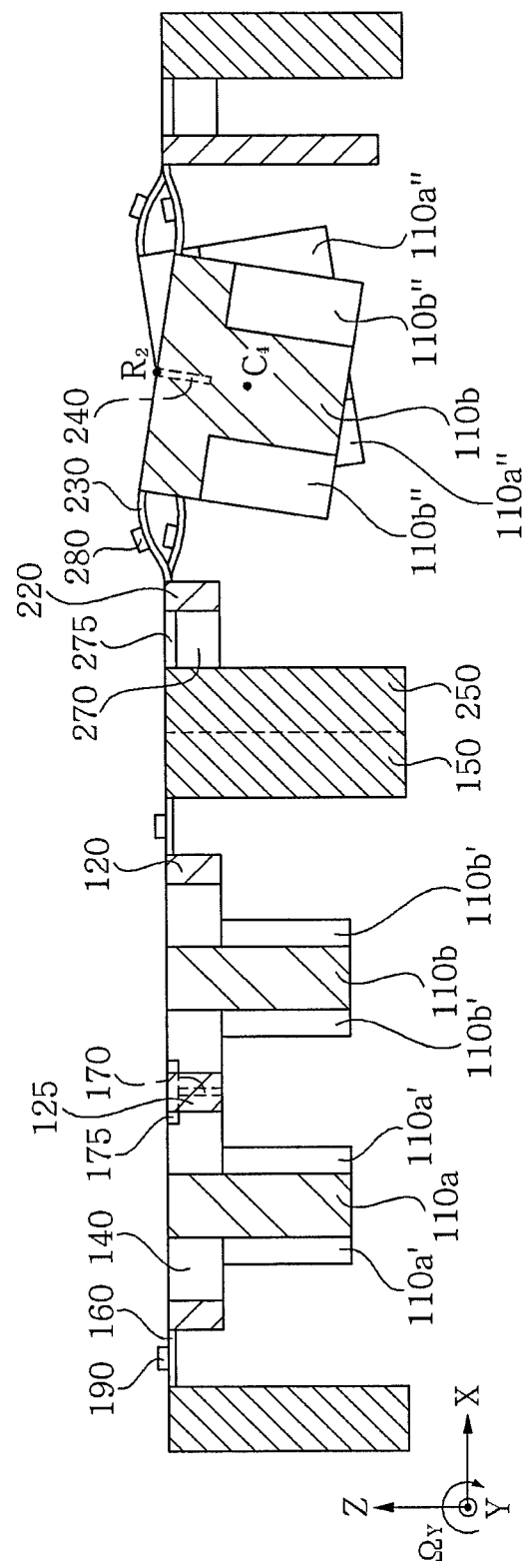

More specifically, as shown in FIGS. 27A and 27B, when angular velocity rotated based on the Y axis is applied to the third and fourth mass bodies 210a and 210b, Coriolis force is generated in a −X axis direction and then generated in a +X axis direction in the third mass body 210a, and Coriolis force is generated in the +X axis direction and then generated in the −X axis direction in the fourth mass body 210b. Therefore, the third and fourth mass bodies 210a and 210b are rotated based on the Y axis in directions opposite to each other, the second sensing unit 280 may sense the displacement of the third and fourth mass bodies 210a and 210b to calculate the Coriolis force, and angular velocity rotated based on the Y axis may be measured through the Coriolis force. In this case, when signals each generated in two fifth flexible parts 230 (second sensing units 280) connected to the third mass body 210a are defined as SX1 and SX2 and signals each generated in two fifth flexible parts 230 (second sensing units 280) connected to the fourth mass body 210b are defined as SX3 and SX4, angular velocity rotated based on the Y axis may be calculated from (SX1-SX2)–(SX3-SX4). As described above, since the signals are differentially output between the third and fourth mass bodies 210a and 210b rotated in the directions opposite to each other, acceleration noise may be offset.

Figure 27C:
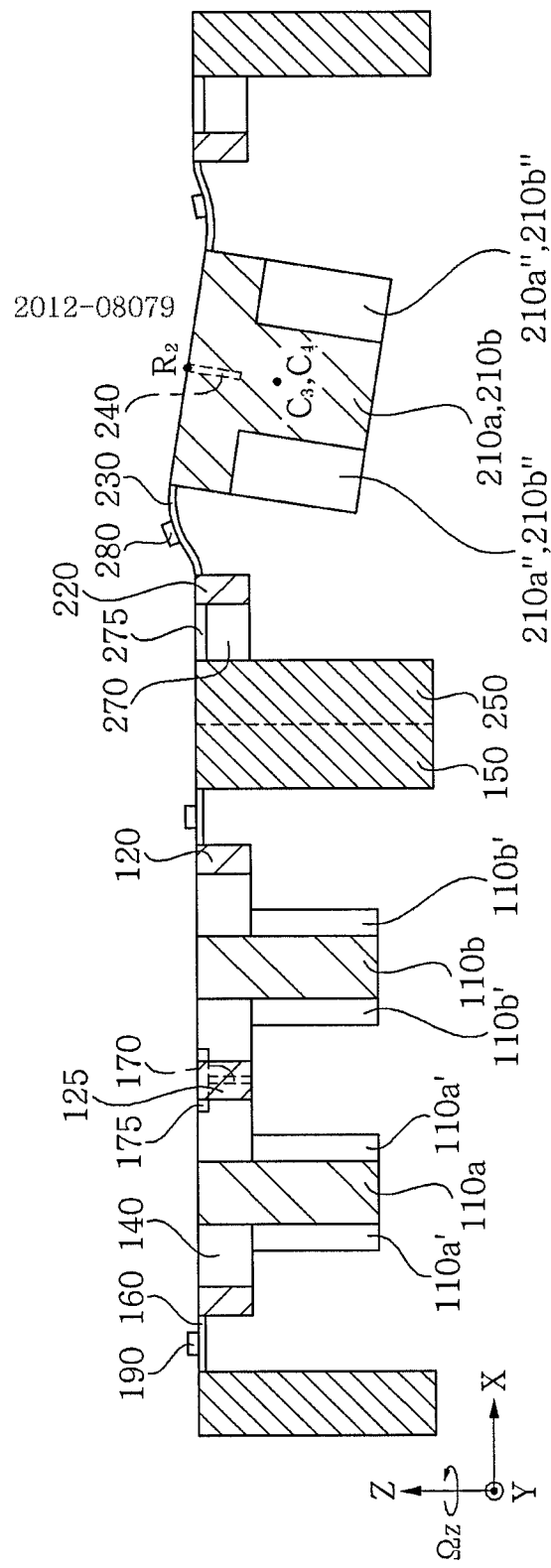
Figure 27D:
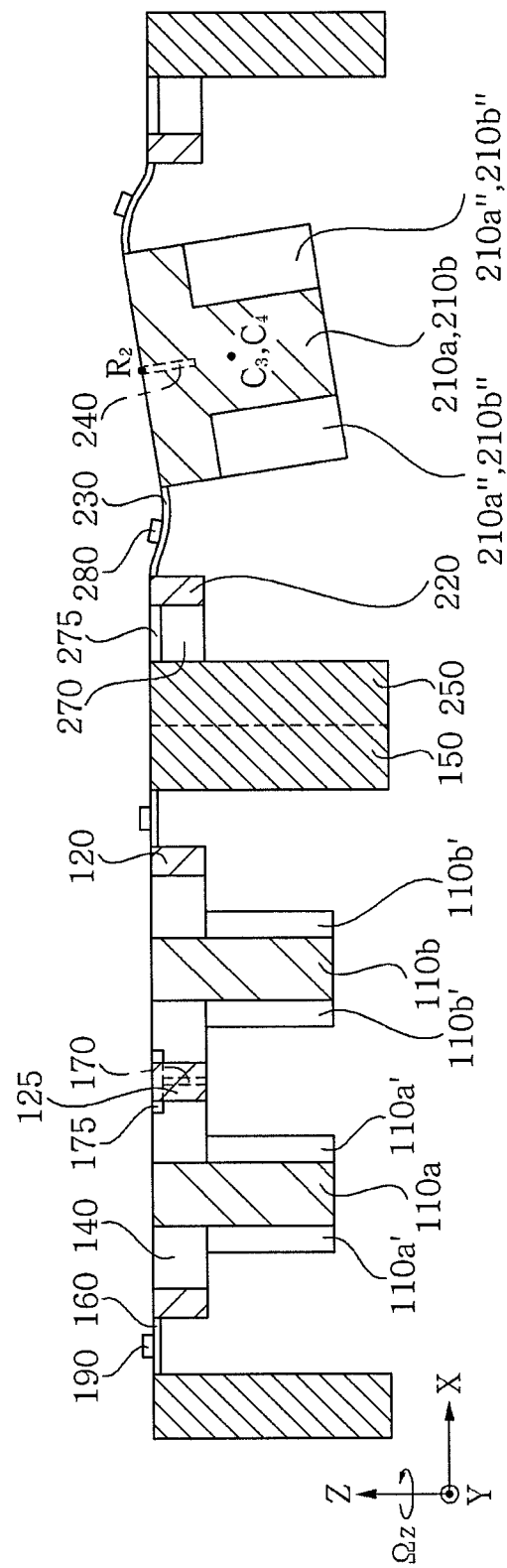

In addition, as shown in FIGS. 27C and 27D, when angular velocity rotated based on the Z axis is applied to the third and fourth mass bodies 210a and 210b, Coriolis force is generated in the –X axis direction and then generated in the +X axis direction in the third mass body 210a, and Coriolis force is generated in the –X axis direction and then generated in the +X axis direction in the fourth mass body 210b. Therefore, the third and fourth mass bodies 210a and 210b are rotated based on the Y axis in the same direction as each other, the second sensing unit 280 may sense the displacement of the third and fourth mass bodies 210a and 210b to calculate the Coriolis force, and angular velocity rotated based on the Y axis may be measured through the Coriolis force. In this case, when signals each generated in two fifth flexible parts 230 (second sensing units 280) connected to the third mass body 210a are defined as SX1 and SX2 and signals each generated in two fifth flexible parts 230 (second sensing units 280) connected to the fourth mass body 210b are defined as SX3 and SX4, angular velocity rotated based on the Z axis may be calculated from (SX1-SX2)+(SX3-SX4).

As a result, the angular velocity sensor 200 according to the present embodiment may measure the angular velocity rotated based on the X or Z axis through the first sensing unit 180 and measure the angular velocity rotated based on the Y or Z axis through the second sensing unit 280. That is, the angular velocity sensor 200 according to the present embodiment may measure angular velocity of three axes including the X axis, the Y axis, and the Z axis. In addition, since the signals of both of the first and second sensing units 180 and 280 may be summed up to measure the angular velocity rotated based on the Z axis, sensitivity may be doubly increased.

Meanwhile, due to the characteristics of the fifth and sixth flexible parts 230 and 240 described above, the third and fourth mass bodies 210a and 210b may be rotated only based on the Y axis with respect to the third frame 220. Therefore, as shown in FIG. 23, even though the third frame 220 is rotated based on the X axis with respect to the fourth frame 250 using the second driving unit 290, the third and fourth mass bodies 210a and 210b are not rotated based on the X axis with respect to the third frame 220. In addition, due to the characteristics of the seventh and eighth flexible parts 260 and 270 described above, the third frame 220 may be rotated only based on the X axis with respect to the fourth frame 250.

Therefore, as shown in FIG. 27A to 27D, when the displacement of the third and fourth mass bodies 210a and 210b is sensed using the second sensing unit 280, even though the Coriolis force in the X axis direction acts, the third frame 220 is not rotated based on the Y axis with respect to the fourth frame 250, and only the third and fourth mass bodies 210a and 210b are rotated based on the Y axis with respect to the third frame 220. As described above, the angular velocity sensor 200 according to the present embodiment includes the third and fourth frames 220 and 250 to individually generate the driving displacement and the sensing displacement of the third and fourth mass bodies 210a and 210b and includes the fifth to eighth flexible parts 230, 240, 260, and 270 formed so that the third and fourth mass bodies 210a and 210b and the third frame 220 are movable only in a specific direction. Therefore, interference between the driving mode and the sensing mode is removed to increase a circuit amplification ratio, thereby making it possible to improve sensitivity, and an effect due to a manufacturing error is decreased, thereby making it possible to improve a yield.

Figure 28:
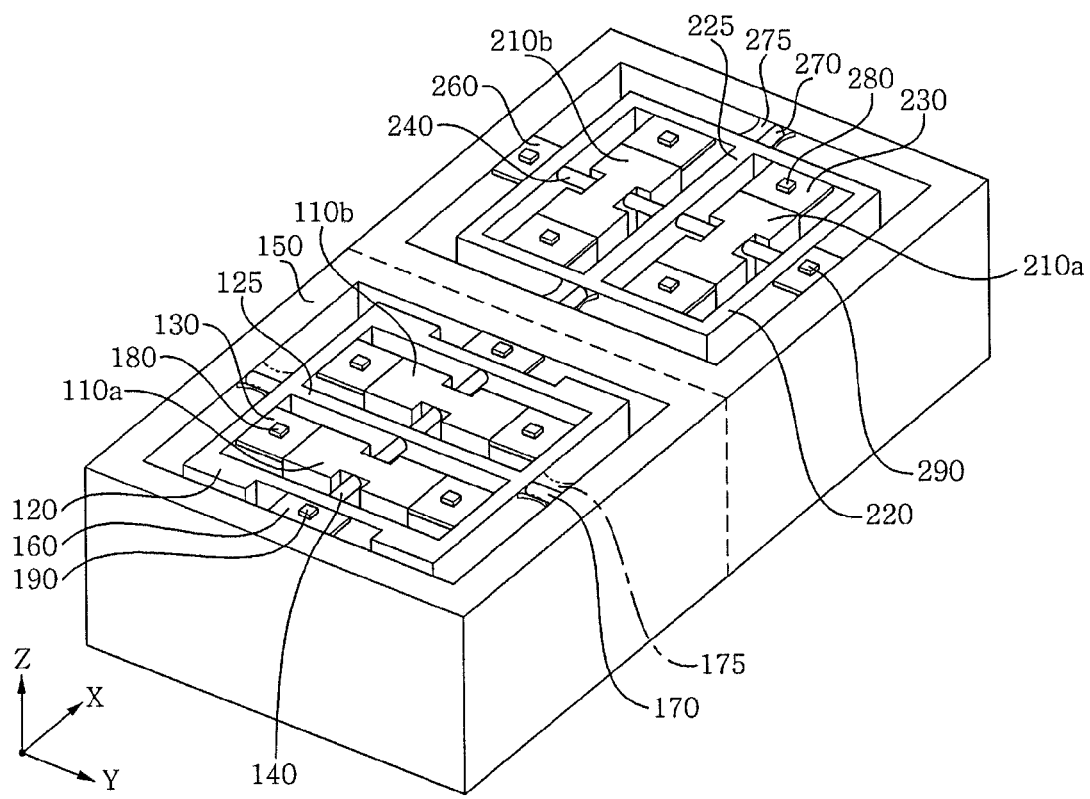
FIG. 28 is a perspective view showing a modified example of the angular velocity sensor according to the second preferred embodiment of the present invention.

However, the second, fourth, sixth, and eighth flexible parts 140, 170, 240, and 270 of the angular velocity sensor according to the preferred embodiment of the present invention are not necessarily formed in a hinge shape having a rectangular cross section as described above. For example, as shown in FIG. 28, the second, fourth, sixth, and eighth flexible parts 140, 170, 240, and 270 may be formed in all possible shapes such as a torsion bar shape, or the like, having a circular cross section.

According to the preferred embodiments of the present invention, it is possible to obtain an angular velocity sensor including a plurality of frames to individually generate driving displacement and sensing displacement of mass bodies and including flexible parts formed so that the mass bodies are movable only in specific directions to remove interference between a driving mode and a sensing mode, decrease an effect due to a manufacturing error, and minimize air damping inevitably generated due to structural characteristics, such that driving displacement is maximized, thereby increasing sensing efficiency.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An angular velocity sensor comprising:
   first and second mass bodies;
   a first frame provided at an outer side of the first and second mass bodies so as to be spaced apart from the first and second mass bodies;
   a first flexible part respectively connecting the first and second mass bodies to the first frame;
   a second flexible part respectively connecting the first and second mass bodies to the first frame;
   a second frame provided at an outer side of the first frame so as to be spaced apart from the first frame;
   a third flexible part connecting the first and second frames to each other; and a fourth flexible part connecting the first and second frames to each other,
   wherein the first and second mass bodies are respectively disposed at both sides of the fourth flexible part, the first frame has a thickness thinner than that of the second frame, in a thickness direction thereof, and
   the first frame has a thickness thinner than the first and second mass bodies, in the thickness direction thereof.

2. The angular velocity sensor as set forth in claim 1, wherein the first and second mass bodies are rotatably connected to the first frame by the first flexible part or the second flexible part, and the first frame is rotatably connected to the second frame by the third flexible part or the fourth flexible part.

3. The angular velocity sensor as set forth in claim 1, wherein the second flexible part respectively connects the first and second mass bodies to the first frame in an X axis direction, and the fourth flexible part connects the first and second frames to each other in the Y axis direction.

4. The angular velocity sensor as set forth in claim 1, wherein the first flexible part respectively connects the first and second mass bodies to the first frame in a Y axis direction, and the third flexible part connects the first and second frames to each other in an X axis direction.

5. The angular velocity sensor as set forth in claim 1, wherein the first flexible part respectively connects the first and second mass bodies to the first frame in a Y axis direction,
the second flexible part respectively connects the first and second mass bodies to the first frame in an X axis direction,
the third flexible part connects the first and second frames to each other in the X axis direction, and
the fourth flexible part connects the first and second frames to each other in the Y axis direction.

6. The angular velocity sensor as set forth in claim 1, wherein the first and second mass bodies include first step parts formed at connection parts at which they are connected to the second flexible part and depressed so as to be stepped inwardly.

7. The angular velocity sensor as set forth in claim 6, wherein the first step parts are formed to be symmetrical to each other in one direction and another direction of the first and second mass bodies.

8. The angular velocity sensor as set forth in claim 1, wherein the first and second mass bodies include second step parts formed at connection part sides at which they are connected to the first flexible part.

9. The angular velocity sensor as set forth in claim 8, wherein the second step parts are formed to be symmetrical to each other in one direction and another direction of the first and second mass bodies.

10. The angular velocity sensor as set forth in claim 1, wherein the first flexible part has a width in a X axis direction larger than a thickness in a Z axis direction,
the second flexible part has a thickness in the Z axis direction larger than a width in a Y axis direction,
the third flexible part has a width in the Y axis direction larger than a thickness in the Z axis direction, and
the fourth flexible part has a thickness in the Z axis direction larger than a width in the X axis direction.

11. The angular velocity sensor as set forth in claim 10, wherein bending stress is generated in the third flexible part, and twisting stress is generated in the fourth flexible part.

12. The angular velocity sensor as set forth in claim 10, further comprising a first sensing unit provided on the first flexible part to sense displacement of the first and second mass bodies,
wherein the first sensing unit senses the displacement generated when the first and second mass bodies are rotated based on an X axis.

13. The angular velocity sensor as set forth in claim 10, further comprising a first driving unit provided on the third flexible part to drive the first frame,
wherein the first driving unit drives the first frame so as to be rotated based on a Y axis.

14. The angular velocity sensor as set forth in claim 1, wherein the first and second mass bodies are rotated based on an X axis with respect to the first frame.

15. The angular velocity sensor as set forth in claim 1, wherein the first frame is rotated based on a Y axis with respect to the second frame.

16. The angular velocity sensor as set forth in claim 1, wherein bending stress is generated in the first flexible part, and twisting stress is generated in the second flexible part.

17. The angular velocity sensor as set forth in claim 1, wherein the second flexible part is disposed over a center of gravity of the first and second mass bodies based on a Z axis direction.

18. The angular velocity sensor as set forth in claim 1, wherein the second flexible part is disposed at a position corresponding to a center of gravity of the first and second mass bodies based on an X axis direction.

19. The angular velocity sensor as set forth in claim 1, further comprising a first support part provided between the first and second mass bodies so as to transverse the first frame in a Y axis direction,
wherein the first support part has a thickness in a Z axis direction that is the same as that of the first frame.

20. The angular velocity sensor as set forth in claim 1, wherein the second flexible part is formed in a torsion bar shape, and
the fourth flexible part is formed in a torsion bar shape.

21. The angular velocity sensor as set forth in claim 1, wherein the first and second mass bodies are disposed to be in parallel with each other.

22. An angular velocity sensor, comprising:
first and second mass bodies;
a first frame provided at an outer side of the first and second mass bodies so as to be spaced apart from the first and second mass bodies;
a first flexible part respectively connects the first and second mass bodies to the first frame;
a second flexible part respectively connects the first and second mass bodies to the first frame;
a second frame provided at an outer side of the first frame so as to be spaced apart from the first frame;
a third flexible part connects the first and second frames to each other; and a fourth flexible part connects the first and second frames to each other;
third and fourth mass bodies respectively disposed to be perpendicular to the first and second mass bodies;
a third frame provided at an outer side of the third and fourth mass bodies so as to be spaced apart from the third and fourth mass bodies;
a fifth flexible part respectively connects the third and fourth mass bodies to the third frame;
a sixth flexible part respectively connects the third and fourth mass bodies to the third frame;
a fourth frame provided at an outer side of the third frame so as to be spaced apart from the third frame;
a seventh flexible part connects the third and fourth frames to each other; and
an eighth flexible part connects the third and fourth frames to each other,
wherein the first and second mass bodies are respectively disposed at both sides of the fourth flexible part,
the first frame has a thickness thinner than that of the second frame, in a thickness direction thereof, the third and fourth mass bodies are respectively disposed at both sides of the eighth flexible part, the fourth frame is disposed at a side of the second frame, and the third frame has a thickness thinner than that of the fourth frame, in the thickness direction thereof.

23. The angular velocity sensor as set forth in claim 22, wherein the third and fourth mass bodies include first step parts formed at connection parts at which they are connected to the sixth flexible part and depressed so as to be stepped inwardly.

24. The angular velocity sensor as set forth in claim 23, wherein the first step parts are formed to be symmetrical to each other in one direction and the other direction of the third and fourth mass bodies.

25. The angular velocity sensor as set forth in claim 22, wherein the third and fourth mass bodies include second step parts formed at connection part sides at which they are connected to the fifth flexible part.

26. The angular velocity sensor as set forth in claim 25, wherein the second step parts are formed to be symmetrical to each other in one direction and another direction of the third and fourth mass bodies.

27. The angular velocity sensor as set forth in claim 22, wherein the third frame is formed to have a thickness in a Z axis direction thinner than those of the third and fourth mass bodies.

28. The angular velocity sensor as set forth in claim 22, wherein the fifth flexible part has a width in a Y axis direction larger than a thickness in a Z axis direction,
the sixth flexible part has a thickness in the Z axis direction larger than a width in an X axis direction,
the seventh flexible part has a width in the X axis direction larger than a thickness in the Z axis direction, and
the eighth flexible part has a thickness in the Z axis direction larger than a width in the Y axis direction.

29. The angular velocity sensor as set forth in claim 28, wherein bending stress is generated in the fifth flexible part, and twisting stress is generated in the sixth flexible part.

30. The angular velocity sensor as set forth in claim 28, wherein bending stress is generated in the seventh flexible part, and twisting stress is generated in the eighth flexible part.

31. The angular velocity sensor as set forth in claim 28, wherein the sixth flexible part is disposed over the center of gravity of the third and fourth mass bodies based on the Z axis direction.

32. The angular velocity sensor as set forth in claim 28, wherein the sixth flexible part is disposed at a position corresponding to the center of gravity of the third and fourth mass bodies based on the Y axis direction.

33. The angular velocity sensor as set forth in claim 28, further comprising a second sensing unit provided on the fifth flexible part to sense displacement of the third and fourth mass bodies,
wherein the second sensing unit senses the displacement generated when the third and fourth mass bodies are rotated based on a Y axis.

34. The angular velocity sensor as set forth in claim 28, further comprising a second driving unit provided on the seventh flexible part to drive the third frame,
wherein the second driving unit drives the third frame so as to be rotated based on an X axis.

35. The angular velocity sensor as set forth in claim 28, wherein the sixth flexible part is formed in a torsion bar shape, and
the eighth flexible part is formed in a torsion bar shape.

36. The angular velocity sensor as set forth in claim 22, wherein the third and fourth mass bodies are rotated based on a Y axis with respect to the third frame.

37. The angular velocity sensor as set forth in claim 22, wherein the third frame is rotated based on an X axis with respect to the fourth frame.

38. The angular velocity sensor as set forth in claim 22, further comprising a second support part provided between the third and fourth mass bodies so as to transverse the third frame in an X axis direction,
wherein the second support part has a thickness in a Z axis direction that is the same as that of the third frame.

* * * * *